(12) United States Patent
Liu et al.

(10) Patent No.: US 11,435,634 B2
(45) Date of Patent: Sep. 6, 2022

(54) DISPLAY PANEL AND DISPLAY DEVICE

(71) Applicant: BOE Technology Group Co., Ltd., Beijing (CN)

(72) Inventors: Liwei Liu, Beijing (CN); Yunsik Im, Beijing (CN); Shunhang Zhang, Beijing (CN); Kai Hou, Beijing (CN); Hui Zhang, Beijing (CN); Hongrun Wang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 37 days.

(21) Appl. No.: 17/263,305

(22) PCT Filed: Mar. 31, 2020

(86) PCT No.: PCT/CN2020/082476
§ 371 (c)(1),
(2) Date: Jan. 26, 2021

(87) PCT Pub. No.: WO2021/195976
PCT Pub. Date: Oct. 7, 2021

(65) Prior Publication Data
US 2021/0356831 A1 Nov. 18, 2021

(51) Int. Cl.
*G02F 1/1362* (2006.01)
*G02F 1/1339* (2006.01)

(52) U.S. Cl.
CPC ...... *G02F 1/136286* (2013.01); *G02F 1/1339* (2013.01); *G02F 1/136209* (2013.01)

(58) Field of Classification Search
CPC ............ G02F 1/1339; G02F 1/136209; G02F 1/136286
See application file for complete search history.

(56) References Cited

U.S. PATENT DOCUMENTS

| 7,385,666 B2 * | 6/2008 | Ashizawa | ......... G02F 1/133512 349/42 |
| 2017/0301707 A1 * | 10/2017 | Jiang | ..................... H01L 51/525 |

* cited by examiner

*Primary Examiner* — Dung T Nguyen
(74) *Attorney, Agent, or Firm* — WHDA, LLP

(57) ABSTRACT

A display panel and a display device are provided. The display panel includes a first substrate and a second substrate. The first substrate includes: a first base substrate; and a plurality of spacers on the first base substrate, including a first sub spacer and a second sub spacer; and the second substrate includes: a second base substrate; a gate line; a plurality of sub-pixels on the second base substrate; a first boss and a second boss on the second base substrate. The second substrate includes a first row of pixels and a second row of pixels adjacent to the first row of pixels; an orthographic projection of the second boss and an orthographic projection of the gate line on the second base substrate overlap; an orthographic projection of the first sub spacer and an orthographic projection of the first boss on the second base substrate at least partially overlap.

20 Claims, 12 Drawing Sheets

DISPLAY PANEL AND DISPLAY DEVICE

CROSS-REFERENCE TO RELATED APPLICATION

This application is a Section 371 National Stage Application of International Application No. PCT/CN2020/082476, filed on Mar. 31, 2020, entitled "DISPLAY PANEL AND DISPLAY DEVICE", which is incorporated herein by reference in their entirety.

TECHNICAL FIELD

The present disclosure relates to the field of display technology, and in particular to a display panel and a display device including the display panel.

BACKGROUND

A liquid crystal display includes a liquid crystal display panel. The liquid crystal display panel includes an array substrate, an opposite substrate that is opposite to and assembled with the array substrate, and a liquid crystal layer between the array substrate and the opposite substrate. The array substrate and the opposite substrate are sealed by a frame sealant. In a liquid crystal cell of the liquid crystal display panel, in order to maintain the uniformity of cell gaps of the liquid crystal cell at various positions, a spacer (referred to as PS) with elastic resilience is usually provided between the array substrate and the opposite substrate. The spacer is in a compressed state and functions to support the liquid crystal cell, so as to keep the cell gap of the liquid crystal display panel be stable and uniform.

The above information disclosed in this section is only used for understanding the background of the inventive concept of the present disclosure, therefore, the above information may include information that does not constitute the prior art.

SUMMARY

In one aspect, a display panel is provided, comprising a first substrate and a second substrate opposite to the first substrate. The first substrate comprises: a first base substrate; and a plurality of spacers on the first base substrate, the plurality of spacers comprising a first sub spacer and a second sub spacer; and the second substrate comprises: a second base substrate; a gate line and a data line on the second base substrate, wherein the gate line extends in a row direction, and the data line extends in a column direction; a plurality of sub-pixels on the second base substrate, wherein the plurality of sub-pixels are arranged in an array in both the row direction and the column direction, and each of the plurality of sub-pixels comprises a light-transmitting area; a first boss on the second base substrate, the first boss extending in the row direction; and a second boss on the second base substrate. Wherein, the second substrate comprises a first row of pixels and a second row of pixels adjacent to the first row of pixels in the column direction, and each of the first row of pixels and the second row of pixels comprises a plurality of sub-pixels sequentially arranged in the row direction; the first boss and the gate line are arranged at an interval in the column direction, and the first boss is located between the gate line and light-transmitting areas of the plurality of sub-pixels in the second row of pixels; an orthographic projection of the second boss on the second base substrate and an orthographic projection of the gate line on the second base substrate overlap; an orthographic projection of the first sub spacer on the second base substrate and an orthographic projection of the first boss on the second base substrate at least partially overlap; and an orthographic projection of the second sub spacer on the second base substrate is located between the gate line and light-transmitting areas of the plurality of sub-pixels in the first row of pixels.

According to some exemplary embodiments, the orthographic projection of the first sub spacer on the second base substrate and the orthographic projection of the second sub spacer on the second base substrate are respectively located on opposite sides of the gate line in the column direction.

According to some exemplary embodiments, the second substrate further comprises a third boss, the third boss is located on a side of the second boss away from the first boss in the column direction, and an orthographic projection of the third boss on the second base substrate and the orthographic projection of the first sub spacer on the second base substrate are arranged in the column direction.

According to some exemplary embodiments, the second substrate further comprises an alignment film on the second base substrate, a vertical distance between the second base substrate and a top surface of each of the first boss, the second boss, and the third boss away from the second base substrate is greater than a vertical distance between the second base substrate and a top surface of a portion of the alignment film in the light-transmitting area away from the second base substrate.

According to some exemplary embodiments, vertical distances between the second base substrate and top surfaces of the first boss, the second boss, and the third boss away from the second base substrate are equal to one another.

According to some exemplary embodiments, the plurality of spacers further comprises a third sub spacer and a fourth sub spacer; a part of an orthographic projection of the third sub spacer on the second base substrate falls within the orthographic projection of the gate line on the second base substrate, and the other part of the orthographic projection of the third sub spacer on the second base substrate is located on a side of the gate line away from the first boss in the column direction; and a part of an orthographic projection of the fourth sub spacer on the second base substrate falls within an orthographic projection of the gate line on the second base substrate, and the other part of the orthographic projection of the fourth sub spacer on the second base substrate is located on a side of the gate line close to the first boss in the column direction.

According to some exemplary embodiments, the orthographic projection of each of the first sub spacer and the second sub spacer on the second base substrate do not overlap the orthographic projection of the gate line on the second base substrate.

According to some exemplary embodiments, the orthographic projection of the second sub spacer on the second base substrate and the orthographic projection of the third boss on the second base substrate do not overlap.

According to some exemplary embodiments, the orthographic projection of the first sub spacer on the second base substrate and the orthographic projection of the third boss on the second base substrate are separated by a first predetermined distance in the column direction, the orthographic projection of the second sub spacer on the second base substrate and the orthographic projection of the first boss on the second base substrate are separated by a second predetermined distance in the column direction, and the first predetermined distance is equal to the second predetermined distance.

According to some exemplary embodiments, the first sub spacer, the second sub spacer, the third sub spacer, and the fourth sub spacer are respectively provided in different sub-pixels.

According to some exemplary embodiments, each of the first row of pixels and the second row of pixels comprises first sub-pixels, second sub-pixels, and third sub-pixels sequentially arranged in the row direction; the orthographic projection of the first sub spacer on the second base substrate is located in the first sub-pixel in the second row of pixels; and the orthographic projection of the second sub spacer on the second base substrate is located in the third sub-pixel in the first row of pixels.

According to some exemplary embodiments, the orthographic projection of the third sub spacer on the second base substrate is located in the second sub-pixel in the first row of pixels; and the orthographic projection of the fourth sub spacer on the second base substrate is located in the second sub-pixel in the second row of pixels.

According to some exemplary embodiments, the second substrate further comprises a common electrode line extending in the row direction, and the orthographic projection of the first boss on the second base substrate and an orthographic projection of the common electrode line on the second base substrate overlap.

According to some exemplary embodiments, the second substrate further comprises a metal step portion, and the metal step portion and the gate line are located in the same layer; and the orthographic projection of the third boss on the second base substrate and an orthographic projection of the metal step portion on the second base substrate overlap.

According to some exemplary embodiments, the first substrate further comprises a black matrix on the first base substrate, and orthographic projections of the plurality of spacers on the second base substrate all fall within an orthographic projection of the black matrix on the second base substrate.

According to some exemplary embodiments, a shortest distance between an edge of the orthographic projection of the first sub spacer on the second base substrate and an edge of the orthographic projection of the black matrix on the second base substrate is less than or equal to 5 microns; and/or, a shortest distance between an edge of the orthographic projection of the second sub spacer on the second base substrate and an edge of the orthographic projection of the black matrix on the second base substrate is less than or equal to 5 microns.

According to some exemplary embodiments, the second substrate further comprises: a first electrode layer on the second base substrate; a gate insulating layer on the first electrode layer; a source and drain layer on the gate insulating layer, the source and drain layer comprising at least the data line and a drain electrode; a passivation layer on the source and drain layer; and a second electrode layer on the passivation layer, wherein the second electrode layer comprises at least a pixel electrode, and the pixel electrode is electrically connected to the first electrode layer through via holes formed in the gate insulating layer and the passivation layer, and the orthographic projection of the metal step portion on the second base substrate partially overlaps an orthographic projection of the first electrode layer on the second base substrate, and the metal step portion covers and contacts a side of the first electrode layer.

According to some exemplary embodiments, the other part of the orthographic projection of the third sub spacer on the second base substrate and the orthographic projection of the third boss on the second base substrate do not overlap; or the other part of the orthographic projection of the third sub spacer on the second base substrate and the orthographic projection of the third boss on the second base substrate partially overlap.

According to some exemplary embodiments, the other part of the orthographic projection of the fourth sub spacer on the second base substrate and the orthographic projection of the first boss on the second base substrate do not overlap; or the other part of the orthographic projection of the fourth sub spacer on the second base substrate and the orthographic projection of the first boss on the second base substrate partially overlap.

According to some exemplary embodiments, the orthographic projection of the third boss on the second base substrate and an orthographic projection of the drain electrode on the second base substrate partially overlap.

According to some exemplary embodiments, each of the first row of pixels and the second row of pixels comprises a first sub-pixel, a second sub-pixel, and a third sub-pixel sequentially arranged in the row direction; the orthographic projection of the first sub spacer on the second base substrate is located in the first sub-pixel in the second row of pixels; and the orthographic projection of the second sub spacer on the second base substrate is located in the second sub-pixel and the third sub-pixel in the first row of pixels.

According to some exemplary embodiments, the orthographic projection of the first sub spacer on the second base substrate further partially overlaps the orthographic projection of the gate line on the second base substrate.

According to some exemplary embodiments, the orthographic projection of the second sub spacer in the second sub-pixel on the second base substrate and the orthographic projection of the third boss on the second base substrate partially overlap.

According to some exemplary embodiments, the orthographic projection of the second sub spacer in the third sub-pixel on the second base substrate and the orthographic projection of the third boss on the second base substrate do not overlap.

According to some exemplary embodiments, the second sub-pixel is a green sub-pixel.

According to some exemplary embodiments, the plurality of spacers further comprises a main spacer, and a height of the main spacer is greater than a height of each of the first sub spacer, the second sub spacer, the third sub spacer, and the fourth sub spacer; and an orthographic projection of the main spacer on the second base substrate and the orthographic projection of the gate line on the second base substrate at least partially overlap.

In another aspect, a display panel is provided, comprising a first substrate and a second substrate opposite to the first substrate. The first substrate comprises: a first base substrate; and a plurality of spacers on the first base substrate, the plurality of spacers comprising a first sub spacer, a second sub spacer and a third sub spacer; and the second substrate comprises: a second base substrate; a gate line and a data line on the second base substrate, wherein the gate line extends in a row direction, and the data line extends in a column direction; a plurality of sub-pixels on the second base substrate, wherein the plurality of sub-pixels are arranged in an array in both the row direction and the column direction; a first boss on the second base substrate, the first boss extending in the column direction; and a second boss on the second base substrate, the second boss extending in the row direction, wherein an orthographic projection of the first boss on the second base substrate and an orthographic projection of the data line on the second base substrate overlap, and an orthographic projection of the second boss on the second base substrate and an orthographic projection of the gate line on the second base substrate overlap; an orthographic projection of each of the first sub spacer and the second sub spacer on the second base substrate and the orthographic projection of the first boss on the second base substrate at least partially overlap; and an orthographic projection of the third sub spacer on the second base substrate and the orthographic projection of the second boss on the second base substrate at least partially overlap.

In a further aspect, a display device is provided, comprising the display panel as described above.

BRIEF DESCRIPTION OF THE DRAWINGS

By describing in detail exemplary embodiments of the present disclosure with reference to the accompanying drawings, the features and advantages of the present disclosure will become more apparent.

DETAILED DESCRIPTION OF EMBODIMENTS

Figure 1:
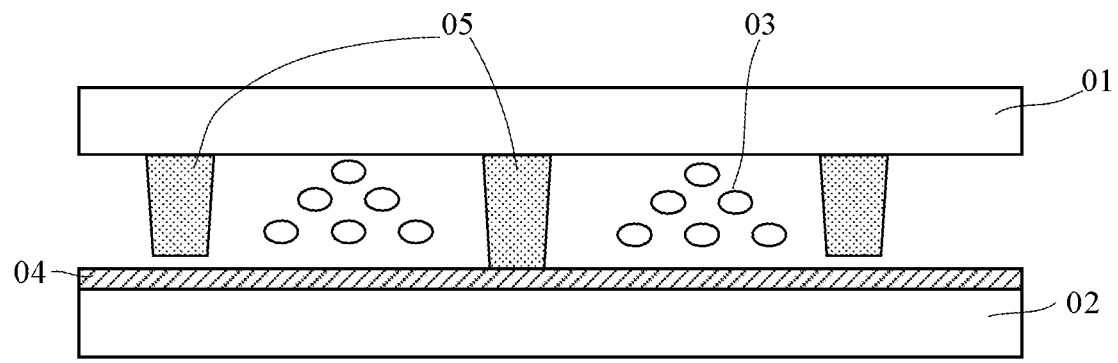
FIG. 1 is a schematic cross-sectional view of a liquid crystal display panel.

In order to make objectives, technical solutions, and advantages of the embodiments of the present disclosure clearer, the technical solutions of the embodiments of the present disclosure will be described clearly and completely in conjunction with accompanying drawings. Obviously, the described embodiments are a part of the embodiments of the present disclosure, rather than all of the embodiments. Based on the described embodiments of the present disclosure, all other embodiments obtained by those skilled in the art without creative labor may fall within the protection scope of the present disclosure.

It should be noted that, in the drawings, for clarity and/or description purposes, sizes and relative dimensions of elements may be enlarged. As such, the size and relative dimension of each element need not be limited to those shown in the drawings. In the specification and drawings, the same or similar reference numerals indicate the same or similar components.

When an element is described as being "on", "connected to" or "coupled to" another element, the element may be directly on the another element, directly connected to the another element, or directly coupled to the another element, or an intervening element may be present. However, when an element is described as being "directly on", "directly connected to" or "directly coupled to" another element, there are no intervening elements. Other terms and/or expressions used to describe the relationship between elements should be interpreted in a similar manner, for example, "between" and "directly between", "adjacent" and "directly adjacent", or "above" and "directly above", or the like. In addition, a term "connection" may refer to a physical connection, an electrical connection, a communication connection, and/or a fluid connection. In addition, the X axis, the Y axis, and the Z axis are not limited to the three axes of the Cartesian coordinate system, and may be interpreted in a broader meaning. For example, the X axis, Y axis, and Z axis may be perpendicular to each other, or may represent different directions that are not perpendicular to each other. For the purpose of the present disclosure, "at least one of X, Y, and Z" and "at least one selected from a group consisting of X, Y, and Z" may be interpreted as only X, only Y, only Z, or any combination of two or more of X, Y, and Z such as XYZ, XYY, YZ, and ZZ. As used herein, a term "and/or" includes any and all combinations of one or more of the listed related items.

It should be noted that although terms "first", "second", or the like may be used herein to describe various components, members, elements, areas, layers, and/or portions, these components, members, elements, areas, layers, and/or portions should not be limited by these terms. Rather, these terms are used to distinguish a component, a member, an element, an area, a layer, and/or a portion from another. Thus, for example, the first component, the first member, the first element, the first area, the first layer, and/or the first portion discussed below may be referred to as the second component, the second member, the second element, the second area, the second layer, and/or the second portion without departing from the teachings of the present disclosure.

For ease of description, spatial relationship terms, for example, "upper", "lower", "left", and "right", and the like may be used herein to describe the relationship between one element or feature and another element or feature as shown in the drawings. It should be understood that the spatial relationship terms are intended to cover other different orientations of the device in use or operation in addition to the orientations described in the drawings. For example, if the devices in the drawings are turned upside down, elements described as "below" or "beneath" other elements or features would be oriented "above" or "over" the other elements or features.

Those skilled in the art should understand that in the present disclosure, unless otherwise specified, expressions "height" or "thickness" refers to a dimension in a direction that is perpendicular to a surface of the display panel (such as a color filter substrate or an array substrate) on which various film layers are provided, that is, a dimension in a light-emitting direction of the display panel, or a dimension along the Z direction in the drawings.

In the present disclosure, unless otherwise specified, an expression "located in the same layer" means that a plurality of layers, elements, components, structures, or devices are made of the same material, and they are formed by the same one patterning process.

FIG. 1 is a schematic cross-sectional view of a liquid crystal display panel. As shown in FIG. 1, the liquid crystal display panel includes a first substrate 01, a second substrate 02 that is opposite to and assembled with the first substrate 01, and a liquid crystal molecule layer 03 provided between the first substrate 01 and the second substrate 02. The liquid crystal display panel further includes at least an alignment film 04 provided on a side of the second substrate 02 facing the first substrate 01 and spacers 05 provided on the first substrate 01 or the second substrate 02. It should be understood that an alignment film is also provided on a side of the first substrate 01 facing the second substrate 02. For example, as shown in FIG. 1, the spacers 05 may be provided on the first substrate 01. The alignment film 04 may induce the liquid crystal molecules in the liquid crystal molecule layer 03 to be aligned. For example, an alignment channel may be formed on a surface of the alignment film 04 by a rubbing process, thereby inducing the liquid crystal molecules in the liquid crystal molecule layer 03 to be aligned. When the liquid crystal display panel displays a dark state, the liquid crystal molecules in the liquid crystal molecule layer 03 are not deflected, and light may not pass through the liquid crystal display panel. When the liquid crystal display panel displays a bright state, the liquid crystal molecules in the liquid crystal molecule layer 03 are deflected under the action of an electric field, and light may pass through the liquid crystal display panel. Moreover, under the action of a color filter pattern provided on the first substrate or the second substrate, the liquid crystal display panel may display light with colors corresponding to the color filter pattern.

It should be noted that the spacers in the liquid crystal display panel play a role in maintaining the uniformity of the cell gaps of the liquid crystal cell at various positions, thereby maintaining the stable and uniform cell gap of the liquid crystal display panel. However, the spacers also restrict the aperture ratio of the liquid crystal display panel to some extent. When the liquid crystal display panel is displaced due to external force, the spacers may scratch the alignment film on the array substrate or the opposite substrate, so that the liquid crystal molecules at this position may not be aligned correctly, resulting in bright spots or other defects on the liquid crystal display panel.

Figure 2:
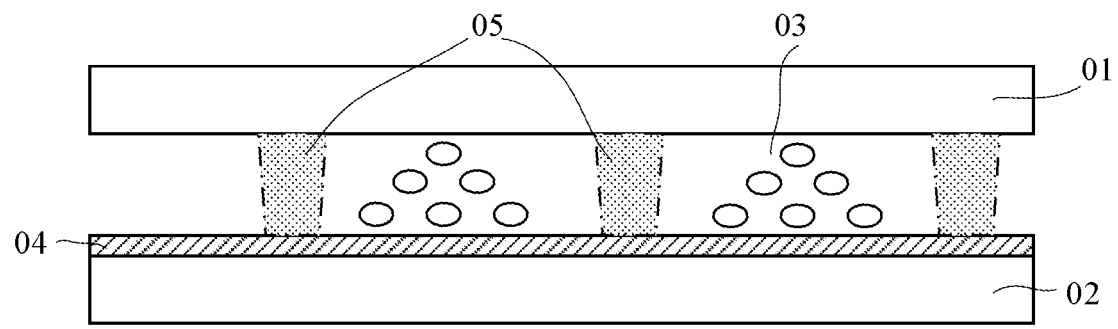
FIG. 2 is a schematic view of the liquid crystal display panel shown in FIG. 1, in which there is a relative displacement between the first substrate and the second substrate due to external force.

FIG. 2 is a schematic view of the liquid crystal display panel shown in FIG. 1, in which there is a relative displacement between the first substrate and the second substrate due to external force. As shown in FIG. 2, when the liquid crystal display panel is relatively displaced (offset) between the first substrate 01 and the second substrate 02 due to an external force, the spacers 05 are displaced from an initial position, thereby scratching the alignment film 04. The scratched portion of the alignment film may not induce the liquid crystal molecules in the liquid crystal molecule layer 03 to align, so that light may pass through the liquid crystal display panel from the scratched portion of the alignment film when the display panel displays a dark state, resulting in light leakage or other defects. It should be noted that, in order to improve the above defects, the width of the black matrix may be increased to cover the scratched portion due to the spacers. For example, an edge of the black matrix is usually at least 45 microns beyond an edge of the spacer. However, an increasement of the width of the black matrix may bring about deficiencies such as reduction in aperture ratio and light transmittance.

Embodiments of the present disclosure provide a display panel and a display device. The display panel includes a first substrate and a second substrate opposite to the first substrate. The first substrate includes: a first base substrate; and a plurality of spacers on the first base substrate, including a first sub spacer and a second sub spacer; and the second substrate includes: a second base substrate; a gate line and a data line on the second base substrate, the gate line extending in a row direction, and the data line extending in a column direction; a plurality of sub-pixels on the second base substrate arranged in an array in the row direction and the column direction, each of the plurality of sub-pixels including a light-transmitting area; a first boss on the second base substrate, the first boss extending in the row direction; and a second boss on the second base substrate. The second substrate includes a first row of pixels and a second row of pixels adjacent to the first row of pixels in the column direction, and each of the first row of pixels and the second row of pixels includes a plurality of sub-pixels sequentially arranged in the row direction; the first boss and the gate line are arranged at an interval in the column direction, and the first boss is located between the gate line and light-transmitting areas of the plurality of sub-pixels in the second row of pixels; an orthographic projection of the second boss on the second base substrate and an orthographic projection of the gate line on the second base substrate overlap; an orthographic projection of the first sub spacer on the second base substrate and an orthographic projection of the first boss on the second base substrate at least partially overlap; and an orthographic projection of the second sub spacer on the second base substrate is located between the gate line and light-transmitting areas of the plurality of sub-pixels in the first row of pixels. Therefore, when the first substrate and the second substrate of the display panel are relatively displaced, the first sub spacer or the second sub spacer may be displaced above the first boss or the second boss to support the first substrate and the second substrate, so as to prevent other spacers from scratching the alignment film, thereby avoiding defects such as light leakage due to the alignment film being scratched by the spacers. In addition, as the display panel may avoid defects such as light leakage due to the alignment film being scratched by the spacer, the display panel does not need to increase the black matrix, thereby increasing the aperture ratio and the light transmittance of the display panel.

Hereinafter, the display panel and the display device provided by the embodiments of the present disclosure will be described in detail with reference to the accompanying drawings.

Figure 3:
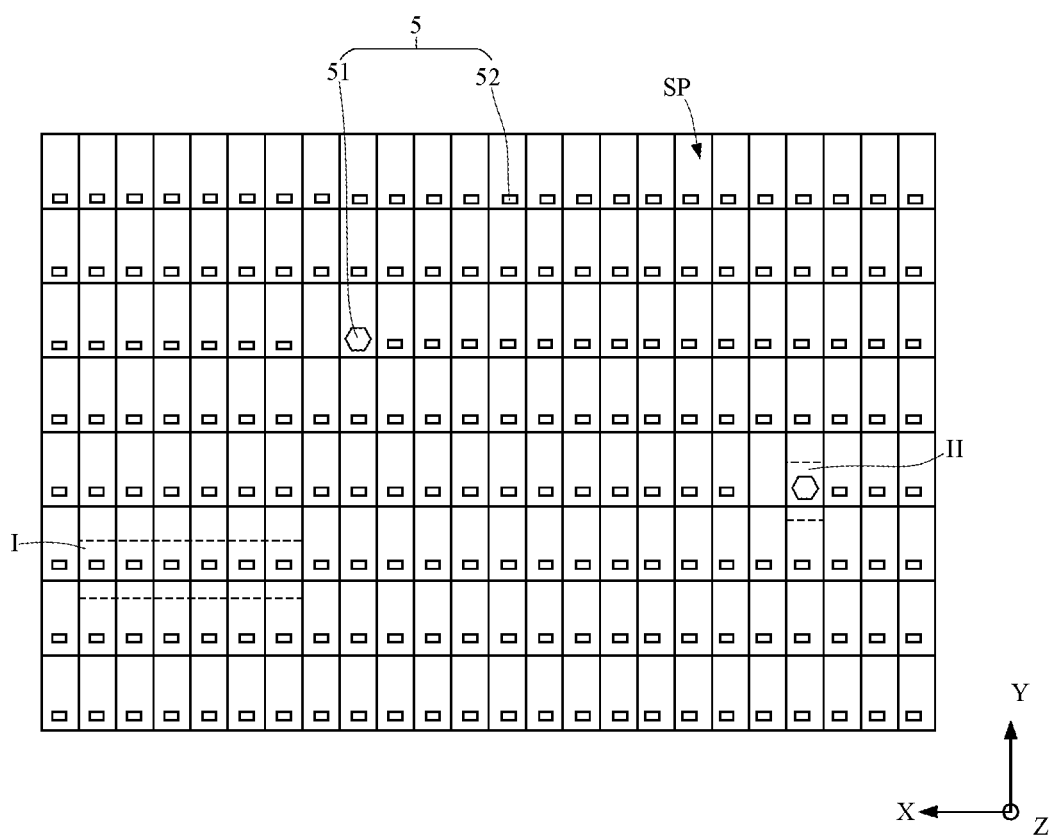
FIG. 3 is a schematic plan view schematically showing a distribution of spacers on a display panel according to embodiments of the present disclosure.
Figure 4:
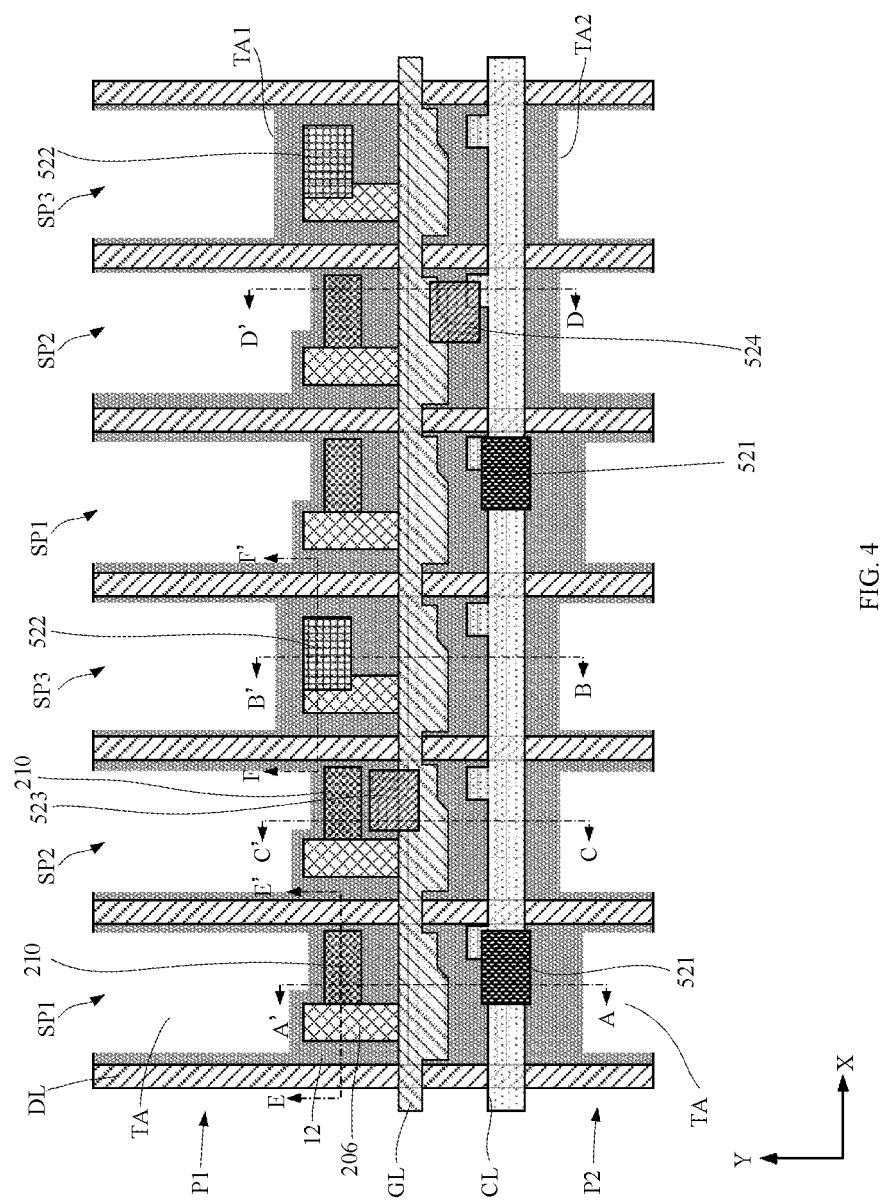
FIG. 4 is a partial enlarged view of the display panel shown in FIG. 3 at part I.
Figure 5:
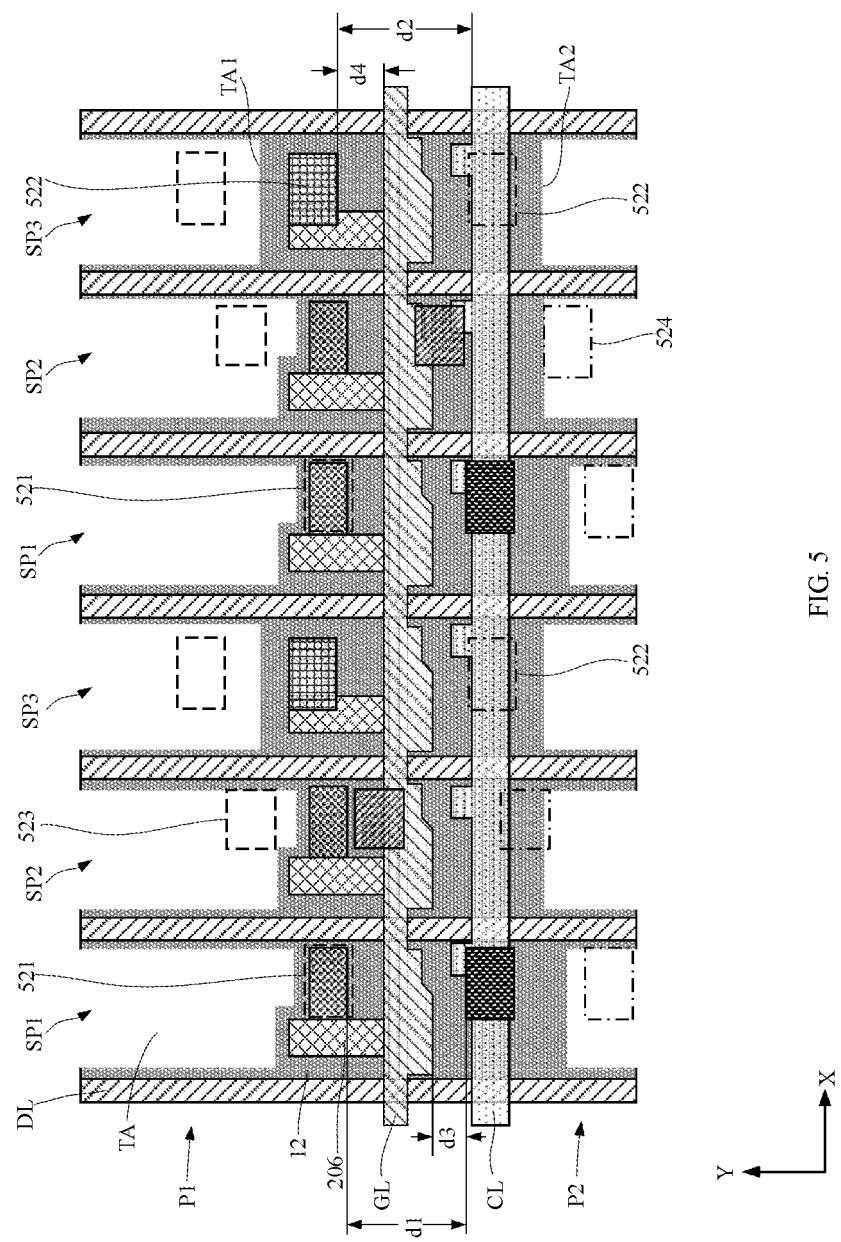
FIG. 5 is a schematic view of the display panel shown in FIG. 3, in which there is a relative displacement between the first substrate and the second substrate due to external force.
Figure 6:
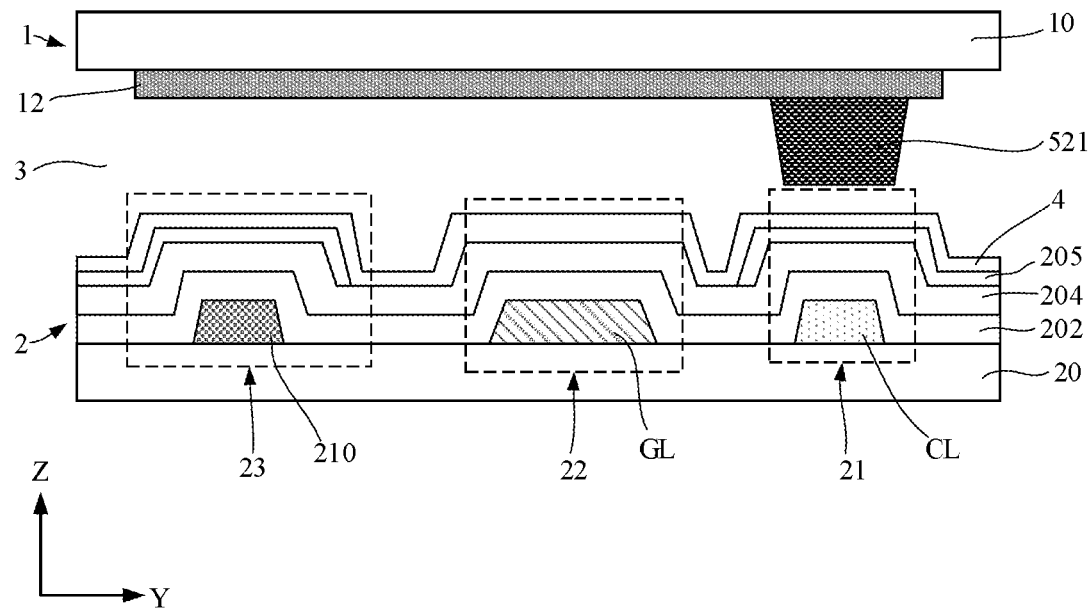
FIG. 6 is a cross-sectional view of the display panel according to embodiments of the present disclosure, taken along the line AA' in FIG. 4.
Figure 7:
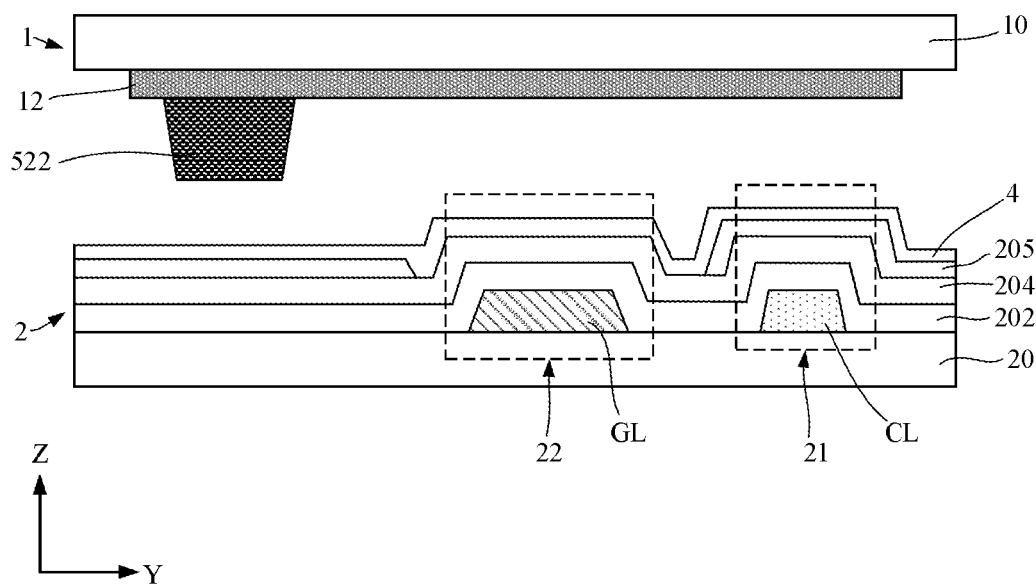
FIG. 7 is a cross-sectional view of the display panel according to embodiments of the present disclosure, taken along line BB' in FIG. 4.
Figure 8:
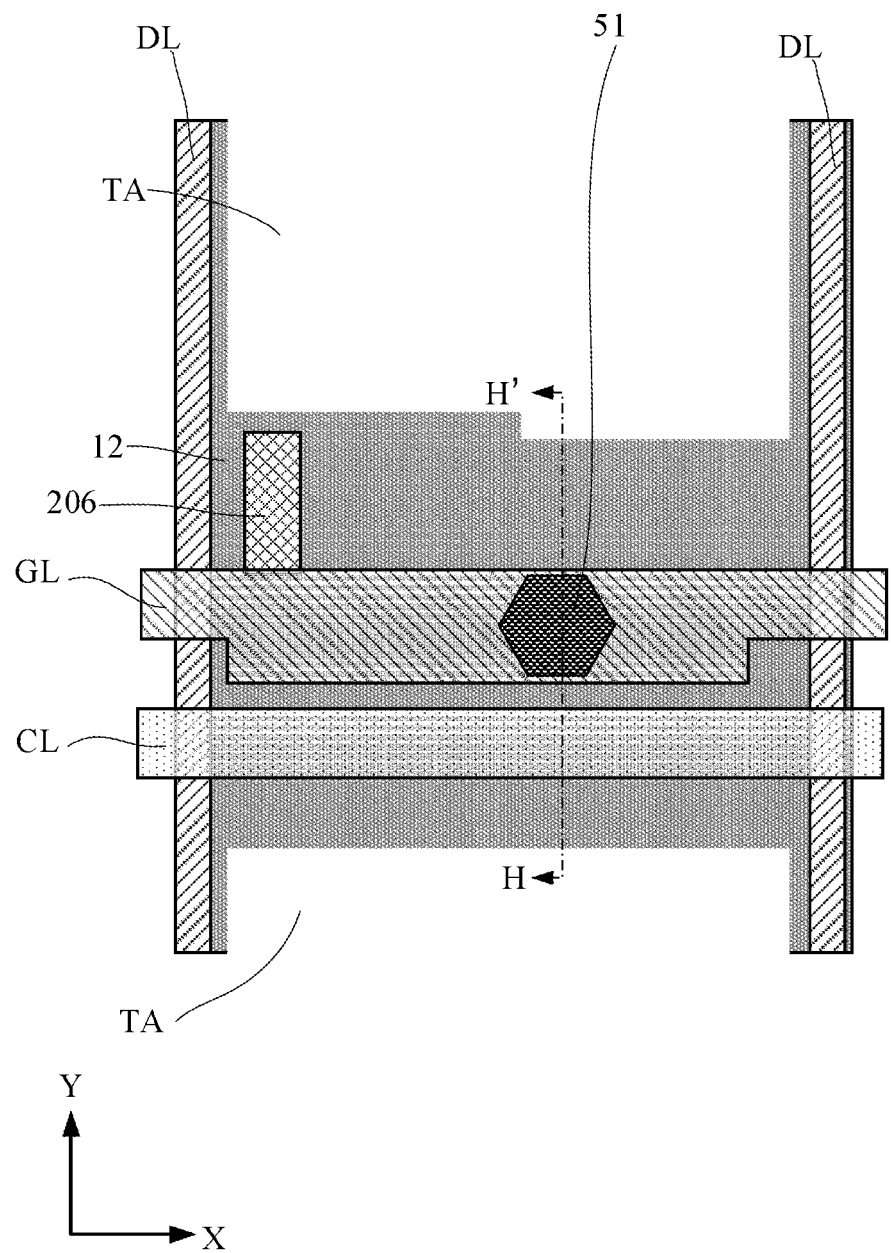
FIG. 8 is a partial enlarged view of the display panel shown in FIG. 3 at part II.
Figure 9:
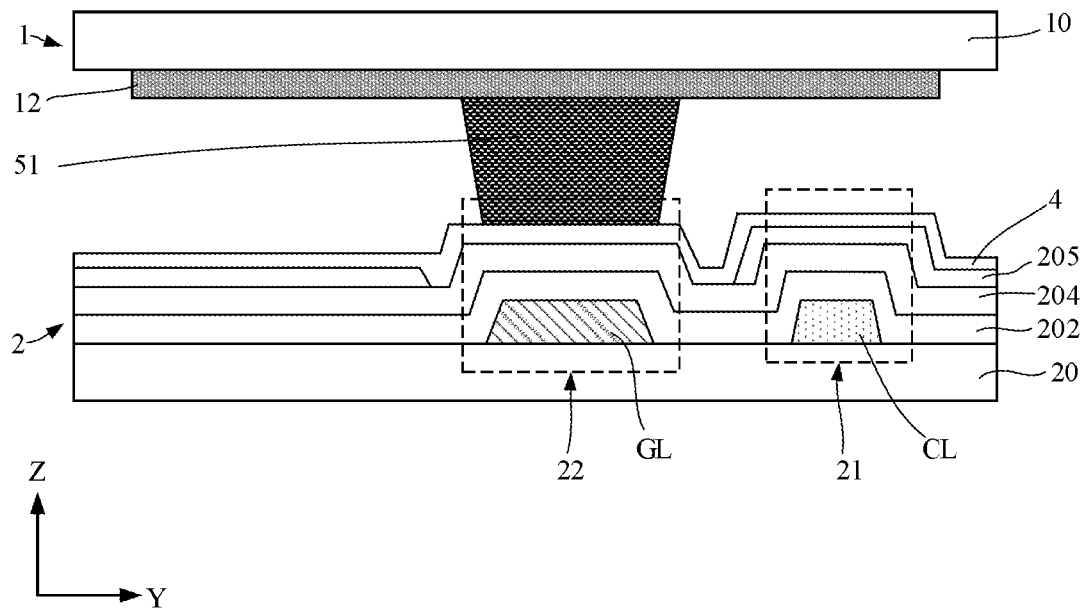
FIG. 9 is a cross-sectional view of the display panel according to embodiments of the present disclosure, taken along line HH' in FIG. 8.
Figure 10:
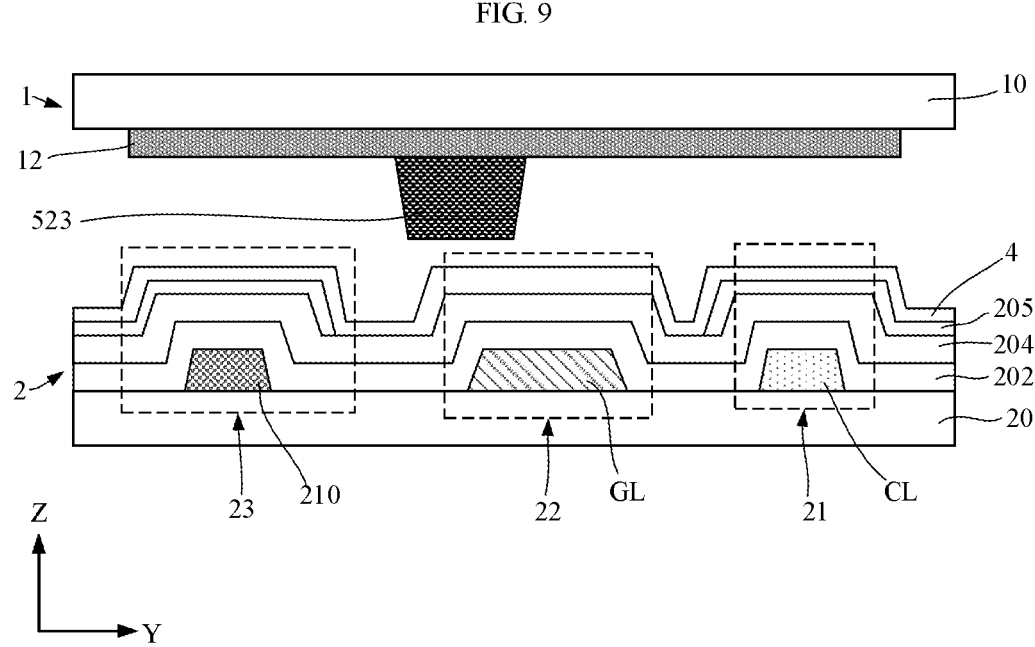
FIG. 10 is a cross-sectional view of a display panel according to embodiments of the present disclosure, taken along line CC' in FIG. 4.
Figure 11:
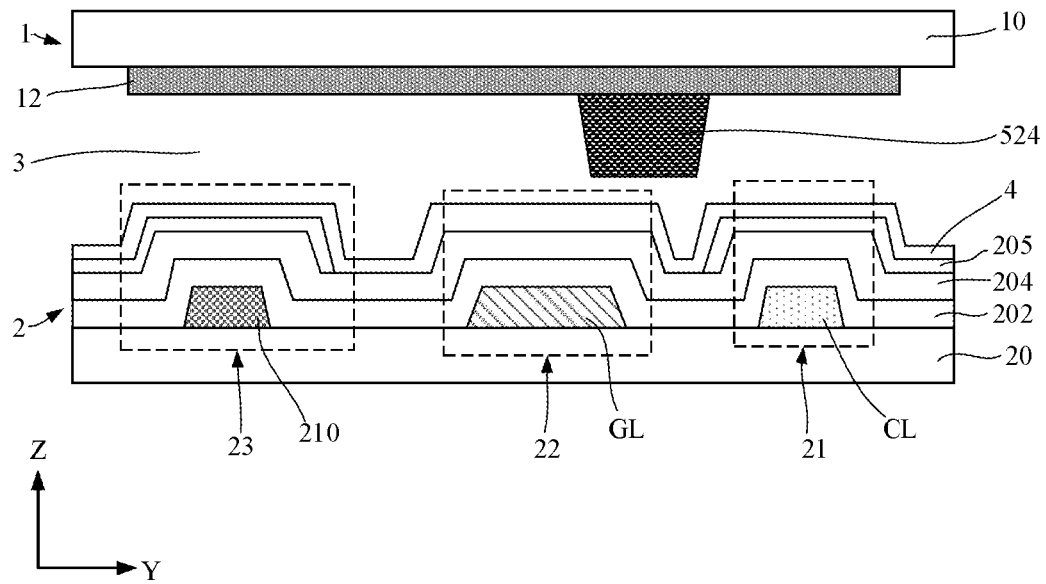
FIG. 11 is a cross-sectional view of a display panel according to embodiments of the present disclosure, taken along line DD' in FIG. 4.
Figure 12:
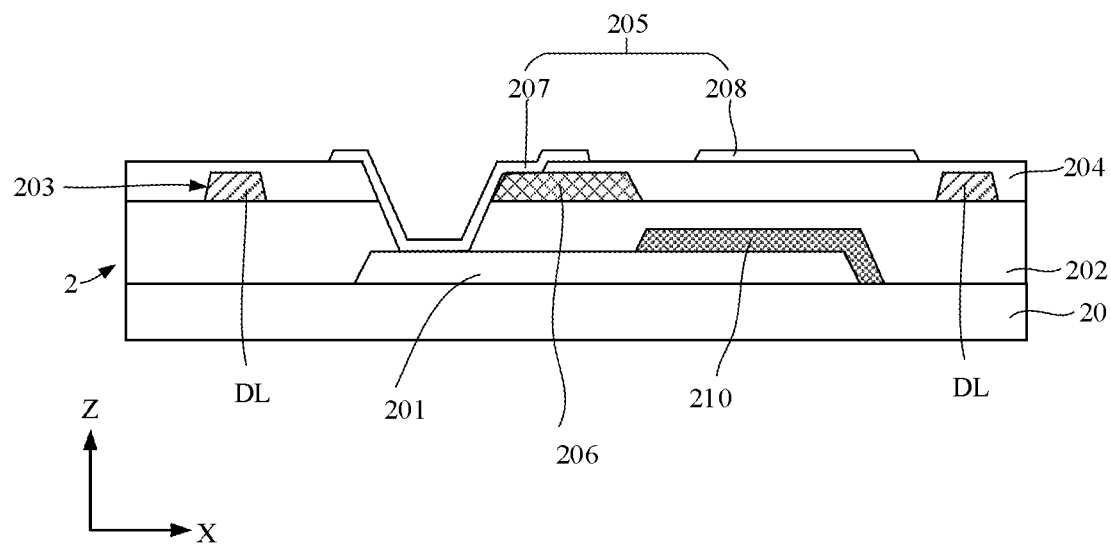
FIG. 12 is a cross-sectional view of a display panel according to embodiments of the present disclosure, taken along line EE' in FIG. 4.
Figure 13:
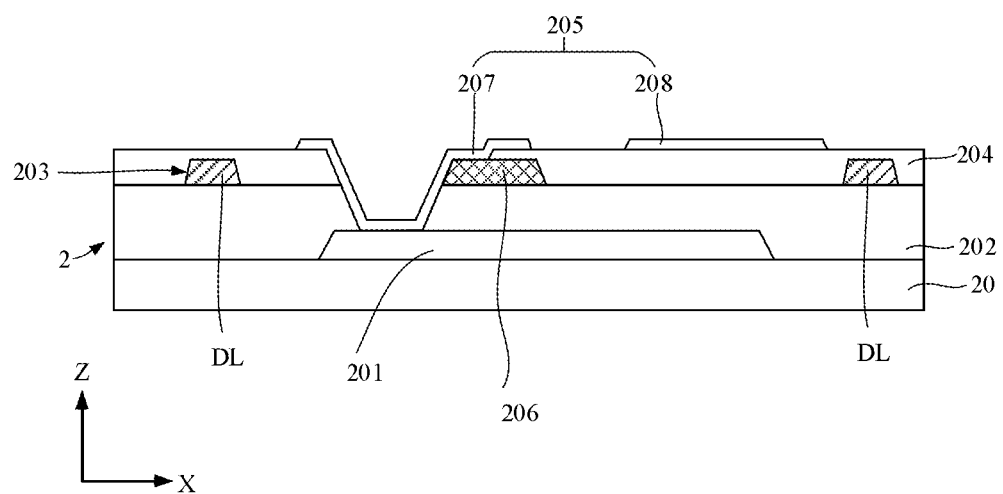
FIG. 13 is a cross-sectional view of a display panel according to embodiments of the present disclosure, taken along line FF' in FIG. 4.

FIG. 3 is a schematic plan view schematically showing a distribution of spacers on the display panel according to embodiments of the present disclosure. FIG. 4 is a partial enlarged view of the display panel shown in FIG. 3 at part I. FIG. 5 is a schematic view of the display panel shown in FIG. 3, in which there is a relative displacement between the first substrate and the second substrate due to external force. FIG. 6 is a cross-sectional view of the display panel according to embodiments of the present disclosure taken along line AA' in FIG. 4. FIG. 7 is a cross-sectional view of the display panel according to embodiments of the present disclosure taken along line BB' in FIG. 4. FIG. 8 is a partial enlarged view of the display panel shown in FIG. 3 at part II. FIG. 9 is a cross-sectional view of the display panel according to embodiments of the present disclosure taken along line HH' in FIG. 8. FIG. 10 is a cross-sectional view of a display panel according to embodiments of the present disclosure taken along line CC' in FIG. 4. FIG. 11 a cross-sectional view of a display panel according to embodiments of the present disclosure taken along line DD' in FIG. 4. FIG. 12 is a cross-sectional view of a display panel according to embodiments of the present disclosure taken along line EE' in FIG. 4. FIG. 13 is a cross-sectional view of a display panel according to embodiments of the present disclosure taken along line FF' in FIG. 4.

It should be noted that in FIG. 12 and FIG. 13, in order to simplify the drawings to clearly show an interface structure of the second substrate, the cross-sectional structure of the first substrate is omitted. The cross-sectional structure of the first substrate may refer to other cross-sectional views.

With reference to FIG. 3 to FIG. 13 in combination, a display panel according to exemplary embodiments of the present disclosure may include a first substrate 1, a second substrate 2 that is opposite to and assembled with the first substrate 1, and a liquid crystal molecule layer 3 provided between the first substrate 1 and the second substrate 2. The display panel further includes at least an alignment film 4 provided on a side of the second substrate 2 facing the first substrate 1, and a plurality of spacers (referred to as PS) 5 provided on the first substrate 1 or the second substrate 2. For example, as shown in FIGS. 6, 7 and 9, the spacer 5 may be provided on the first substrate 1. The alignment film 4 may induce the liquid crystal molecules in the liquid crystal molecule layer 3 to be aligned, for example, an alignment channel may be formed on a surface of the alignment film 4 by a rubbing process, thereby inducing the liquid crystal molecules in the liquid crystal molecule layer 3 to be aligned. When the display panel displays a dark state, the liquid crystal molecules in the liquid crystal molecule layer 3 are not deflected, and light may not pass through the display panel. When the display panel displays a bright state, the liquid crystal molecules in the liquid crystal molecule layer 3 are deflected under the action of an electric field, and light may pass through the display panel. Moreover, by means of a color filter pattern provided on the first substrate or the second substrate, the display panel may display light with a color corresponding to the color filter pattern.

With reference to FIG. 3 to FIG. 9, the plurality of spacers 5 may include a plurality of main spacers 51 and a plurality of sub spacers 52. It should be noted that, in the schematic plan views of FIG. 3 to FIG. 4 and FIG. 8, the main spacer 51 is represented by a "hexagon", and the sub spacer 52 is represented by a "rectangle". This is only for distinction and for the convenience of illustration, and does not mean a limitation on the shape of the main spacer and the sub spacer. The main spacer and the sub spacer may adopt various shapes of spacers known in the art, which may not be repeated here.

For example, a height of the main spacer 51 is greater than a height of the sub spacer 52. For example, the height of the sub spacer 52 may be 70%-95% of the height of the main spacer 51. When the first substrate 1 is aligned with the second substrate 2 in a normal state, the main spacer 51 plays a supporting role. When the display panel is pressed by a large external force, the sub spacer 52 may also play a supporting role to improve pressure resistance, and when the external force is removed, the main spacer and the sub spacer may provide restoring force. By arranging the main spacer and the sub spacer with different heights, the supporting ability of the spacers may be improved, and various mura or other defects may be avoided.

With reference to FIG. 3 and FIG. 4 in combination, the display panel may include a plurality of sub-pixels SP provided in an array, that is, the plurality of sub-pixels SP are arranged in both the row direction (direction X in the drawing) and the column direction (direction Y in the drawing). The plurality of sub-pixels SP may include at least a first sub-pixel SP1, a second sub-pixel SP2, and a third sub-pixel SP3. For example, the first sub-pixel SP1, the second sub-pixel SP2, and the third sub-pixel SP3 may be a red sub-pixel, a green sub-pixel and a blue sub-pixel, respectively.

The plurality of spacers 5 are respectively provided in the plurality of sub-pixels SP. With reference to FIG. 3, at most one spacer 5 (one of the main spacer 51 or the sub spacer 52) is provided in each sub-pixel SP.

In embodiments of the present disclosure, the display panel includes a plurality of main spacers 51 and a plurality of sub spacers 52. The number of main spacers 51 may be smaller than the number of sub spacers 52. For example, in an example shown in FIG. 3, 8 rows and 24 columns (i.e., 192) of sub-pixels SP are shown, in which two main spacers 51 and 188 sub spacers 52 are provided. With such an arrangement, it may be ensured that the spacers provide a better supporting effect for the liquid crystal cell.

For example, in some exemplary embodiments, no spacer is provided in a sub-pixel adjacent to the sub-pixel where each main spacer 51 is located. For example, in the exemplary embodiments shown in FIG. 3, no spacer is provided in the sub-pixel that is on the left side and adjacent to each sub-pixel, where the main spacer 51 is located, in the row direction. In this way, in the process of identifying or detecting the main spacer, the main spacer may be accurately identified or detected by identifying or detecting a position where no spacer is provided, so as to achieve the purpose of accurately identifying or detecting the main spacer, and achieve the purpose of accurately identifying or detecting two types of spacers. On this basis, the quality of the manufactured display products may be improved.

It should be noted that in the embodiments of FIG. 3, each sub-pixel is provided with at most one spacer. However, the embodiments of the present disclosure are not limited thereto. In other embodiments, according to actual needs of distribution density, it is also possible to provide a plurality of spacers in one sub-pixel.

It should also be noted that the display panel according to the embodiments of the present disclosure is particularly suitable for the ADS (Advanced Super Dimension Switch) mode, and the embodiments described herein also take the ADS mode display panel as an example. However, the embodiments of the present disclosure are not limited to this, and they may also be applied to display devices in various other modes, such as TN (Twisted Nematic) mode, VA (Vertical Alignment) mode, and other modes. In addition, the display panel may be a touch display panel.

Optionally, the first substrate 1 may be a color filter substrate, and the second substrate 2 may be an array substrate. Optionally, the second substrate 2 may be a COA array substrate, and the first substrate 1 may be a substrate opposite to the COA array substrate.

With reference to FIG. 3 to FIG. 9 in combination, the first substrate 1 may include a first base substrate 10 and a black matrix 12 provided on the first base substrate 10. Various spacers 5 (including the main spacers 51 and the sub spacers 52) are located on the first base substrate 10, and their orthographic projections on the first base substrate 10 all fall into an orthographic projection of the black matrix 12 on the first base substrate 10.

The second substrate 2 may include a second base substrate 20, gate lines GL, common electrode lines CL, and data lines DL provided on the second base substrate 20. The gate lines GL and the common electrode lines CL extend in the row direction X, and the data lines DL extend in the column direction Y. The gate lines GL and the data lines DL cross to delimit a plurality of sub-pixels SP. Each sub-pixel SP includes a light-transmitting area TA from which light may exit the display panel, thereby realizing a display function. It should be understood that an orthographic projection of the light-transmitting area TA of each sub-pixel SP on the second base substrate 20 and an orthographic projection of the black matrix 12 on the second base substrate 20 do not overlap. Orthographic projections of various spacers 5, various signal lines including the gate lines GL, the common electrode lines CL, and the data lines DL, and various thin film transistors for driving respective sub-pixels on the second base substrate 20 all fall into the orthographic projection of the black matrix 12 on the second base substrate 20.

With reference to FIG. 4, a partial planar structure of two adjacent rows of pixels and an opaque area between the two adjacent rows of pixels are schematically shown. For convenience of description, the two adjacent rows of pixels may be referred to as first row of pixels (a row of pixels on the upper side in FIG. 4) P1 and second row of pixels (a row of pixels on the lower side in FIG. 4) P2, respectively. Exemplarily, each row of pixels may respectively include a plurality of pixels arranged in the row direction X, and each pixel may include a first sub-pixel SP1, a second sub-pixel SP2, and a third sub-pixel SP3 that are sequentially arranged in the row direction X. For example, the first sub-pixel SP1, the second sub-pixel SP2, and the third sub-pixel SP3 may be a red sub-pixel, a green sub-pixel, and a blue sub-pixel, respectively. Likewise, each of the first sub-pixel SP1, the second sub-pixel SP2, and the third sub-pixel SP3 includes a light-transmitting area TA.

In the opaque area (that is, an area blocked by the black matrix 12) between the first row of pixels P1 and the second row of pixels P2, a gate line GL and a common electrode line CL both extend in the row direction X, and the gate line GL and the common electrode line CL are arranged at intervals in the column direction Y. The gate line GL is configured to supply a gate scan signal to each sub-pixel SP in the first row of pixels P1. The common electrode line CL electrically connects common electrodes of the sub-pixels in the first row of pixels and the second row of pixels.

With reference to FIG. 4 to FIG. 7, the plurality of sub spacers 52 may include a first sub spacer 521 and a second sub spacer 522. The first sub spacer 521 is close to the light-transmitting area TA of a sub-pixel in the second row of pixels P2, and the second sub spacer 522 is close to the light-transmitting area TA of a sub-pixel in the first row of pixels P1. Specifically, the light-transmitting area TA of each sub-pixel in the first row of pixels P1 includes a first edge TA1 (lower edge in FIG. 4) close to the gate line GL, and the light-transmitting area TA of each sub-pixel in the second row of pixels P2 includes a second edge TA2 (upper edge in FIG. 4) close to the gate line GL. The first sub spacer 521 is close to the second edge TA2, and the second sub spacer 522 is close to the first edge TA1.

It should be noted that, unless otherwise specified, the lower edge of the light-transmitting area of each sub-pixel (including the first sub-pixel, the second sub-pixel, and the third sub-pixel) may be referred to the first edge TA1, and the upper edge of the light-transmitting area of each sub-pixel (including the first sub-pixel, the second sub-pixel, and the third sub-pixel) may be referred to the second edge TA2, regardless of a projection of the upper edge or the lower edge in the plan view is a straight line or a polyline.

The first sub spacer 521 and the second sub spacer 522 are provided in different sub-pixels. In the present disclosure, an expression "the sub spacer is provided in the sub-pixel" or "the sub-pixel where the sub spacer is located" means that an orthographic projection of the sub spacer on the base substrate overlaps with or falls within an orthographic projection of the sub-pixel on the base substrate. For example, the first sub spacer 521 is provided in the first sub-pixel SP1, and the second sub spacer 522 is provided in the third sub-pixel SP3. More specifically, the first sub spacer 521 is provided in a first sub-pixel SP1 in the second row of pixels P2, and the first sub spacer 521 is close to the second edge TA2 of the light-transmitting area of the first sub-pixel SP1. The second sub spacer 522 is provided in a third sub-pixel SP3 in the first row of pixels P1, and the second sub spacer 522 is close to the first edge TA1 of the light-transmitting area of the third sub pixel SP3.

The second substrate 2 further includes a first boss 21 and a second boss 22 provided on the second base substrate 20. It should be noted that, in the present disclosure, the "boss" included in the second substrate represents a structure as follows: a convex structure that is formed by a plurality of stacked film layers and is higher than portions adjacent to the convex structure, specifically, the boss is higher than portions of the alignment film 4 at other positions on the second base substrate 20, that is, a vertical distance between an upper surface (that is, a surface away from the second base substrate 20) of the boss and the second base substrate 20 is greater than a vertical distance between an upper surface (that is, a surface away from the second base substrate 20) of the alignment film 4 at other positions (for example, at the light-transmitting area TA) and the second base substrate 20. For example, as shown in FIG. 6-FIG. 7 and FIG. 9-FIG. 11, the first boss 21 and the second boss 22 (portions framed by the dashed line in the drawings) are schematically shown. Each of the first boss 21 and the second boss 22 has a top surface away from the second base substrate 20, and a vertical distance between the second base substrate 20 and the top surface of each of the first boss 21 and the second boss 22 is greater than a vertical distance between the second base substrate 20 and the upper surface (that is, the surface away from the second base substrate 20) of the alignment film 4 in the light-transmitting area TA. In this way, when one sub spacer abuts against a certain boss, it may be ensured that the sub spacer may not contact a portion of the alignment film in the light-transmitting area even if the sub spacer enters the light-transmitting area.

With reference to FIG. 4 and FIG. 6, the first sub spacer 521 is provided corresponding to the first boss 21, that is, an orthographic projection of the first sub spacer 521 on the second base substrate 20 and an orthographic projection of the first boss 21 on the second base substrate 20 at least partially overlap. In this way, when the display panel is pressed by a large external force, if the first substrate 1 is not displaced relative to the second substrate 2, the first sub spacer 521 may abut against the first boss 21 to play a supporting role, so as to maintain the reliability and uniformity of the cell gap of the liquid crystal cell.

Continuing to refer to FIG. 4 and FIG. 6, the second boss 22 is located between the first sub spacer 521 and the second sub spacer 522 in the column direction Y. Specifically, the second boss 22 is located between the first sub spacer 521 and the light-transmitting area TA of the first sub-pixel SP1 in the first row of pixels P1, and the second boss 22 is also located between the second sub spacer 522 and the light-transmitting area TA of the third sub-pixel SP3 in the second row of pixels P2.

Optionally, the second substrate 2 further includes a third boss 23 provided on the second base substrate 20. The third boss 23 is provided on a side of the second boss 22 away from the first boss 21, that is, the third boss 23 and the first boss 21 are respectively located on opposite sides of the second boss 22 in the column direction Y. For example, the third boss 23 is provided in the first sub-pixel SP1 in the first row of pixels P1, and the third boss 23 is close to the first edge TA1 of the light-transmitting area of the first sub-pixel SP1. The first sub-pixel where the third boss 23 is located is adjacent to the first sub-pixel where the first sub spacer 521 is located in the column direction Y. It should be understood that the third boss 23 has the same meaning as the first boss 21 or the second boss 22 as described above.

In other words, the orthographic projection of the first sub spacer 521 on the second base substrate 20 and the orthographic projection of the first boss 21 on the second base substrate 20 at least partially overlap. The orthographic projection of the first boss 21 on the second base substrate 20, an orthographic projection of the second boss 22 on the second base substrate 20, and an orthographic projection of the third boss 23 on the second base substrate 20 are sequentially arranged at intervals in the column direction Y from the second row of pixels P2 toward the first row of pixels P1. The orthographic projection of the second sub spacer 522 on the second base substrate 20, the orthographic projection of the second boss 22 on the second base substrate 20, and the orthographic projection of the first boss 21 on the second base substrate 20 are sequentially arranged at intervals in the column direction Y from the first row of pixels P1 toward the second row of pixels P2.

The orthographic projection of the first sub spacer 521 on the second base substrate 20 and the orthographic projection of the second boss 22 on the second base substrate 20 are separated by a certain distance in the column direction Y, and the distance may be a third predetermined distance d3 (see FIG. 5). The orthographic projection of the first sub spacer 521 on the second base substrate 20 and the orthographic projection of the third boss 23 on the second base substrate 20 are separated by a certain distance in the column direction Y, and the distance may be a first predetermined distance d1 (see FIG. 5). The orthographic projection of the second sub spacer 522 on the second base substrate 20 and the orthographic projection of the second boss 22 on the second base substrate 20 are separated by a certain distance in the column direction Y, and the distance may be a fourth predetermined distance d4 (see FIG. 5). The orthographic projection of the second sub spacer 522 on the second base substrate 20 and the orthographic projection of the first boss 21 on the second base substrate 20 are separated by a certain distance in the column direction Y, and the distance may be a second predetermined distance d2 (see FIG. 5). It should be noted that the above described "predetermined distance" may be a distance between two adjacent edges of the orthographic projections of the sub spacer and the bosses on the second base substrate.

As described above, when the display panel is pressed by a large external force, the first substrate 1 and the second substrate 2 may be relatively displaced (i.e., offset). FIG. 5 is a cross-sectional schematic view of the display panel shown in FIG. 4 when the first substrate and the second substrate are relatively displaced. It should be noted that various dashed frames represent positions of the sub spacers after the first substrate 1 has been displaced in the upward direction in FIG. 5 relative to the second substrate 2, and various dot-dashed frames represent positions of the sub spacers after the first substrate 1 has been displaced in the downward direction in FIG. 5 relative to the second substrate 2. As the second boss 22 and the third boss 23 are both provided on the upper side of the first sub spacer 521 in the column direction Y, when the first substrate 1 is upwardly offset relative to the second substrate 2, the first sub spacer 521 may be displaced above the second boss 22 or the third boss 23, that is, when the upward displacement occurs, the orthographic projection of the first sub spacer 521 on the second base substrate 20 may at least partially overlap the orthographic projection of the second boss 22 or the third boss 23 on the second base substrate 20. In this case, the first sub spacer 521 may be placed against the second boss 22 or the third boss 23 to maintain the reliability and uniformity of the cell gap of the liquid crystal cell. Meanwhile, it is possible to prevent other sub spacers (for example, the second sub spacer 522 represented by the dashed frame in FIG. 5) entering the light-transmitting area TA of the sub-pixel from scratching the alignment film. Similarly, since the second boss 22 and the first boss 21 are both provided on the lower side of the second sub spacer 522 in the column direction Y, when the first substrate 1 is downwardly offset relative to the second substrate 2, the second sub spacer 522 may be displaced above the second boss 22 or the first boss 21, that is, when the downward displacement occurs, the orthographic projection of the second sub spacer 522 on the second base substrate 20 may at least partially overlap the orthographic projection of the second boss 22 or the first boss 21 on the second base substrate 20. In this case, the second sub spacer 522 may be placed against the second boss 22 or the first boss 21 to maintain the reliability and uniformity of the cell gap of the liquid crystal cell. Meanwhile, other sub spacers (for example, the first sub spacer 521 represented by the dot dashed frame in FIG. 5) entering into the light-transmitting area TA of the sub-pixel may be prevented from scratching the alignment film.

For example, the above described first predetermined distance d1 may be substantially equal to a maximum upward displacement of the first substrate 1 relative to the second substrate 2. In this way, even when the first substrate 1 undergoes a maximum upward displacement relative to the second substrate 2 under the action of an external force, it may still be ensured that the third boss 23 supports the first sub spacer 521. Similarly, the above described second predetermined distance d2 may be substantially equal to the maximum downward displacement of the first substrate 1 relative to the second substrate 2. In this way, even when the first substrate 1 undergoes a maximum downward displacement relative to the second substrate 2 under the action of an external force, it may still be ensured that the first boss 21 supports the second sub spacer 522. Therefore, even if the first substrate 1 undergoes the largest displacement in the column direction Y relative to the second substrate 2, the reliability and uniformity of the cell gap of the liquid crystal cell may be maintained, and other sub spacers may be prevented from scratching the alignment film.

Optionally, the maximum upward displacement of the first substrate 1 relative to the second substrate 2 is substantially equal to the maximum downward displacement of the first substrate 1 relative to the second substrate 2. Therefore, the first predetermined distance d1 may be substantially equal to the second predetermined distance d2.

In embodiments of the present disclosure, by arranging the first sub spacer 521 and the second sub spacer 522 that are "complementary" in the column direction Y, it may be ensured that when the first substrate 1 undergoes upward displacement and downward displacement relative to the second substrate, some of the sub spacers may still be supported on the bosses, thus the reliability and uniformity of the cell gap of the liquid crystal cell may still be maintained, and other sub spacers may be prevented from scratching the alignment film.

In an example of FIG. 4, the common electrode line CL is farther away from the first row of sub-pixels than the gate line GL. Specifically, the gate line GL is located between the common electrode line CL and the light-transmitting area TA of each sub-pixel of the first row of pixels P1.

The first boss 21 may include the common electrode line CL, and the second boss 22 may include the gate line GL. In other words, referring to FIG. 4, FIG. 6 and FIG. 7, the orthographic projection of the first boss 21 on the second base substrate 20 and the orthographic projection of the common electrode line CL on the second base substrate 20 overlap, for example, the orthographic projection of the first boss 21 on the second base substrate 20 covers the orthographic projection of the common electrode line CL on the second base substrate 20. The orthographic projection of the second boss 22 on the second base substrate 20 and the orthographic projection of the gate line GL on the second base substrate 20 overlap, for example, the orthographic projection of the second boss 22 on the second base substrate 20 covers the orthographic projection of the gate line GL on the second base substrate 20.

For example, the gate line GL and the common electrode line CL are provided on the second base substrate 20, for example, both the gate line GL and the common electrode line CL may be made of a metal conductive material. It should be understood that other film layers may also be provided on the second base substrate 20, including but not limited to, a gate insulating layer, a source and drain layer, a passivation layer, a pixel electrode layer, a common electrode layer, and an alignment film. These film layers may refer to the film structure of the existing array substrate, which will not be repeated here.

As shown in FIG. 6 and FIG. 7, portions where the gate line GL and the common electrode line CL are provided are higher than some portions where no gate line GL and no common electrode line CL are provided. In this way, the first boss 21 and the second boss 22 as described above are formed on the second base substrate 20.

As described above, the gate lines GL and the common electrode lines CL both extend from the left side of the second substrate 2 to the right side of the second substrate 2 in the row direction X, that is, the first boss 21 and the second boss 22 both extend from the left side of the second substrate 2 to the right side of the second substrate 2 in the row direction X. In this way, even if the first substrate 1 is displaced leftwards or rightwards relative to the second substrate 2 under the action of external force, the first boss 21 may still support the first sub spacer 521, thereby maintaining the reliability and uniformity of the cell gap of the liquid crystal cell, and preventing other sub spacers from scratching the alignment film.

As shown in FIG. 6 and FIG. 7, a metal step portion 210 is additionally formed on the second base substrate 20, and the metal step portion 210 may be located in the same layer as the gate line CL. The third boss 23 includes the metal step portion 210, that is, an orthographic projection of the third boss 23 on the second base substrate 20 and an orthographic projection of the metal step portion 210 on the second base substrate 20 overlap, for example, the orthographic projection of the third boss 23 on the second base substrate 20 covers the orthographic projection of the metal step portion 210 on the second base substrate 20.

In the embodiments of the present disclosure, with such a configuration, it may be ensured that when the first substrate 1 is displaced relative to the second substrate in various directions, such as upwards, downwards, leftwards, and rightwards, some sub spacers may still be supported against the bosses, and thus the reliability and uniformity of the cell gap of the liquid crystal cell may still be maintained, and the alignment film may be prevented from being scratched by other sub spacers.

With reference to FIG. 4, the orthographic projections of all the sub spacers 52 on the second base substrate 20 fall within the orthographic projection of the black matrix 12 on the second base substrate 20. In other words, all the sub spacers 52 are provided within a coverage area of the black matrix 12.

As described above, in the related art, the width of the black matrix is increased to cover the area that may be scratched by the spacers. In comparison, in the embodiments of the present disclosure, as the spacers may be prevented from scratching the alignment film, the width of the black matrix may be reduced. Specifically, a shortest distance between an edge of the orthographic projection of the first sub spacer 521 on the second base substrate 20 and an edge of the orthographic projection of the black matrix on the second base substrate 20 may be less than or equal to 5 microns, for example, equal to 5 microns, 4.5 microns and so on. In this way, an overall coverage area of the black matrix 12 may be reduced, and the aperture ratio and the light transmittance of the display panel may be improved.

With continued reference to FIG. 4 and FIG. 5, the plurality of sub spacers 52 may further include a third sub spacer 523 and a fourth sub spacer 524. The third sub spacer 523 and the fourth sub spacer 524 may be respectively provided in the second sub-pixel SP2. For example, the third sub spacer 523 may be provided in the second sub-pixel SP2 in the first row of pixels P1, and the fourth sub spacer 524 may be provided in the second sub-pixel SP2 in the second row of pixels P2.

Optionally, the above described third boss 23 may also be provided in the second sub-pixel SP2, that is, a metal step portion 210 is provided. In other words, between two adjacent second sub-pixels SP2 in the column direction Y, the orthographic projection of the first boss 21 on the second base substrate 20, the orthographic projection of the second boss 22 on the second base substrate 20, and the orthographic projection of the third boss 23 on the second base substrate 20 are sequentially arranged at intervals in the column direction Y from the second row of pixels P2 toward the first row of pixels P1.

With reference to FIG. 4, FIG. 10 and FIG. 11 in combination, an orthographic projection of the third sub spacer 523 on the second base substrate 20 and the orthographic projection of the second boss 22 on the second base substrate 20 may at least partially overlap. Specifically, a part of the orthographic projection of the third sub spacer 523 on the second base substrate 20 falls within the orthographic projection of the second boss 22 on the second base substrate 20, and the other part of the orthographic projection of the third sub spacer 523 on the second base substrate 20 is located on a side of the orthographic projection of the second boss 22 on the second base substrate 20 away from the first boss 21. Optionally, the orthographic projection of the third sub spacer 523 on the second base substrate 20 and the orthographic projection of the third boss 23 on the second base substrate 20 may also at least partially overlap.

An orthographic projection of the fourth sub spacer 524 on the second base substrate 20 and the orthographic projection of the second boss 22 on the second base substrate 20 may at least partially overlap. Specifically, a part of the orthographic projection of the fourth sub spacer 524 on the second base substrate 20 falls within the orthographic projection of the second boss 22 on the second base substrate 20, and the other part of the orthographic projection of the fourth sub spacer 524 on the second base substrate 20 is located on a side of the orthographic projection of the second boss 22 on the second base substrate 20 close to the first boss 21. Optionally, the orthographic projection of the fourth sub spacer 524 on the second base substrate 20 and the orthographic projection of the first boss 21 on the second base substrate 20 may also at least partially overlap.

The orthographic projection of the third sub spacer 523 on the second base substrate 20 and the orthographic projection of the first boss 21 on the second base substrate 20 are separated by a certain distance in the column direction Y, and the distance may be a fifth predetermined distance. The orthographic projection of the fourth sub spacer 524 on the second base substrate 20 and the orthographic projection of the third boss 23 on the second base substrate 20 are separated by a certain distance in the column direction Y, and the distance may be a sixth predetermined distance.

For example, the fifth predetermined distance may be smaller than the second predetermined distance d2. The sixth predetermined distance may be smaller than the first predetermined distance d1.

In this way, with reference to FIG. 5, when the upward displacement of the first substrate 1 relative to the second substrate 2 is less than the maximum upward displacement, the fourth sub spacer 524 may be supported on the second boss 22 or the third boss 23 to maintain the reliability and uniformity of the cell gap of the liquid crystal cell. Meanwhile, other sub spacers entering the light-transmitting area TA of the sub-pixel may be prevented from scratching the alignment film. Similarly, when the downward displacement of the first substrate 1 relative to the second substrate 2 is less than the maximum downward displacement, the third sub spacer 523 may be supported on the second boss 22 or the first boss 21 to maintain the reliability and uniformity of the cell gap of the liquid crystal cell. Meanwhile, other sub spacers entering the light-transmitting area TA of the sub-pixel may be prevented from scratching the alignment film. In other words, by arranging the third sub spacer 523 and the fourth sub spacer 524 that are "complementary" in the column direction Y, the reliability and uniformity of the cell gap of the liquid crystal cell may be further ensured, and other sub spacers may be further prevented from scratching the alignment film.

With reference to FIG. 4, the third sub spacer 523 and the fourth sub spacer 524 are far away from the edge of the black matrix 12, and they have little or no influence on the aperture ratio of the sub-pixels. In embodiments of the present disclosure, the third sub spacer 523 and the fourth sub spacer 524 are provided in the second sub-pixel SP2, for example, the green sub-pixel, and the aperture ratio of the green sub-pixel may be increased. Since the light transmittance of the green sub-pixel is greater than the light transmittance of each of the red sub-pixel and the blue sub-pixel, the overall light transmittance of the display panel may be improved with this arrangement.

With further reference to FIG. 6, FIG. 7, FIG. 10 and FIG. 11, the orthographic projection of each of the first sub spacer 521, the second sub spacer 522, the third sub spacer 523, and the fourth sub spacer 524 on the second base substrate 20 falls within the orthographic projection of the black matrix 12 on the second base substrate 20.

With reference to FIG. 6, the orthographic projection of the first sub spacer 521 on the second base substrate 20 and the orthographic projection of the first boss 21 on the second base substrate 20 at least partially overlap. Optionally, the orthographic projection of the first sub spacer 521 on the second base substrate 20 may cover the orthographic projection of the first boss 21 on the second base substrate 20. For example, the width of the first sub spacer 521 may be about 12 microns, the width of the common electrode line CL (i.e., the first boss 21) may be about 6.85 microns, that is, the width of the first sub spacer 521 is greater than the width of the first boss 21, such that the orthographic projection of the first sub spacer 521 on the second base substrate 20 may cover the orthographic projection of the first boss 21 on the second base substrate 20. Further, as shown in FIG. 6, an interval between the first boss 21 and the second boss 22 (i.e., a distance between the common electrode line CL and the gate line GL in the column direction Y) may be equal to about 6 microns. The orthographic projection of the first sub spacer 521 on the second base substrate 20 may not overlap with the orthographic projection of the second boss 22 on the second base substrate 20.

With reference to FIG. 7, the orthographic projection of the second sub spacer 522 on the second base substrate 20 does not overlap with the orthographic projection of each of the first boss 21 and the second boss 22 on the second base substrate 20.

With reference to FIG. 10, the orthographic projection of the third sub spacer 523 on the second base substrate 20 and the orthographic projection of the second boss 22 on the second base substrate 20 at least partially overlap. For example, the width of the third sub spacer 523 may be about 12 microns, the width of the third boss 23 may be about 6.85 microns, and an interval between the second boss 22 and the third boss 23 may be equal to about 7 microns. The orthographic projection of the third sub spacer 523 on the second base substrate 20 and the orthographic projection of the third boss 23 on the second base substrate 20 may not overlap. Optionally, considering factors such as process fluctuations, the orthographic projection of the third sub spacer 523 on the second base substrate 20 and the orthographic projection of the third boss 23 on the second base substrate 20 may partially overlap.

With reference to FIG. 11, the orthographic projection of the fourth sub spacer 524 on the second base substrate 20 and the orthographic projection of the second boss 22 on the second base substrate 20 at least partially overlap. For example, the width of the fourth sub spacer 524 may be about 12 microns, and an interval between the second boss 22 and the first boss 21 may be equal to about 6 microns. The orthographic projection of the fourth sub spacer 524 on the second base substrate 20 and the orthographic projection of the first boss 21 on the second base substrate 20 may not overlap. Optionally, considering factors such as process fluctuations, the orthographic projection of the fourth sub spacer 524 on the second base substrate 20 and the orthographic projection of the first boss 21 on the second base substrate 20 may partially overlap.

In embodiments shown in FIG. 6, FIG. 7, FIG. 10, and FIG. 11, the metal step portion 210 constituting the third boss 23 is located in the same layer as the common electrode line CL constituting the first boss 21 and the gate line GL constituting the second boss 22, that is, the metal step portion 210 may be made of the same metal conductive material and formed by the same patterning process as the common electrode line CL and the gate line GL. In this way, no additional patterning process is required to form the third boss 23, which is beneficial to save the number of patterning processes and the manufacturing cost. Of course, the embodiments of the present disclosure are not limited to this. The metal step portion 210 constituting the third boss 23 may be located in the same layer as the data line DL, that is, the metal step portion 210 may be made of the same metal conductive material and formed by the same patterning process as the data line DL.

Further, with reference to FIG. 12 and FIG. 13, the second substrate 2 may include a first electrode layer 201, the metal step portion 210, a gate insulating layer 202, a source and drain layer 203, a passivation layer 204, and a second electrode layer 205 provided on the second base substrate 20. The first electrode layer 201 may be an ITO electrode layer. The metal step portion 210 may contact the first electrode layer 201, that is, the orthographic projection of the metal step portion 210 on the second base substrate 20 partially overlaps the orthographic projection of the first electrode layer 201 on the second base substrate 20, and the metal step portion 210 covers an end portion of the first electrode layer 201. The source and drain layer 203 may include a data line DL and a drain electrode 206 located therein. The second electrode layer 205 may include a pixel electrode 207. The pixel electrode 207 may be electrically connected to the first electrode layer 201 through via holes formed in both the gate insulating layer 202 and the passivation layer 204. The drain electrode 206 may be electrically connected to the pixel electrode 207. Optionally, the second electrode layer 205 may also include a common electrode 208. It should be understood that the second substrate 2 may also include structures such as a gate electrode, an active layer, and a source electrode of a thin film transistor, which may refer to the structure on the existing array substrate, and will not be repeated here.

With reference to FIG. 4 and FIG. 12 in combination, the orthographic projection of the second sub spacer 522 on the second base substrate 20 and the orthographic projection of the drain electrode 206 on the second base substrate 20 partially overlap, for example, a dimension of an overlapped area, in which the orthographic projection of the second sub spacer 522 on the second base substrate 20 and the orthographic projection of the drain electrode 206 on the second base substrate 20 overlap, in the row direction X is about 2.3 microns.

FIG. 8 and FIG. 9 respectively show a plan view and a cross-sectional view of the display panel at a position where the main spacer is located according to embodiments of the present disclosure. With reference to FIG. 8 and FIG. 9 in combination, an orthographic projection of the main spacer 51 on the second base substrate 20 and an orthographic projection of the second boss 22 (i.e., the gate line GL) on the second base substrate 20 at least partially overlap. For example, the orthographic projection of the main spacer 51 on the second base substrate 20 falls within the orthographic projection of the second boss 22 (i.e., the gate line GL) on the second base substrate 20.

Referring back to FIG. 3, in embodiments of the present disclosure, a unit including 192 sub-pixels is designed as a minimum supporting unit. In the minimum supporting unit, 2 main spacers 51 and 188 sub spacers 52 may be provided. The spacers are provided in different sub-pixels, respectively. The 188 sub spacers 52 may include 64 first sub spacers 521, 64 second sub spacers 522, 30 third sub spacers 523, and 30 fourth sub spacers 524. With such an arrangement, a distribution density of the spacers may provide sufficient supporting force, so that the reliability and uniformity of the cell gap of the liquid crystal cell may be maintained.

In embodiments of the present disclosure, by providing the above-described sub spacers and designing the distribution density of the main spacers and the sub spacers, it may be ensured that the density of the spacers is greater than a predetermined density. For example, the predetermined density may be approximately equal to a density of 2600 square microns/square millimeters. It should be noted that an expression "density" in the present disclosure may be understood as a contact area of the spacers in a unit or in a unit area.

Figure 14:
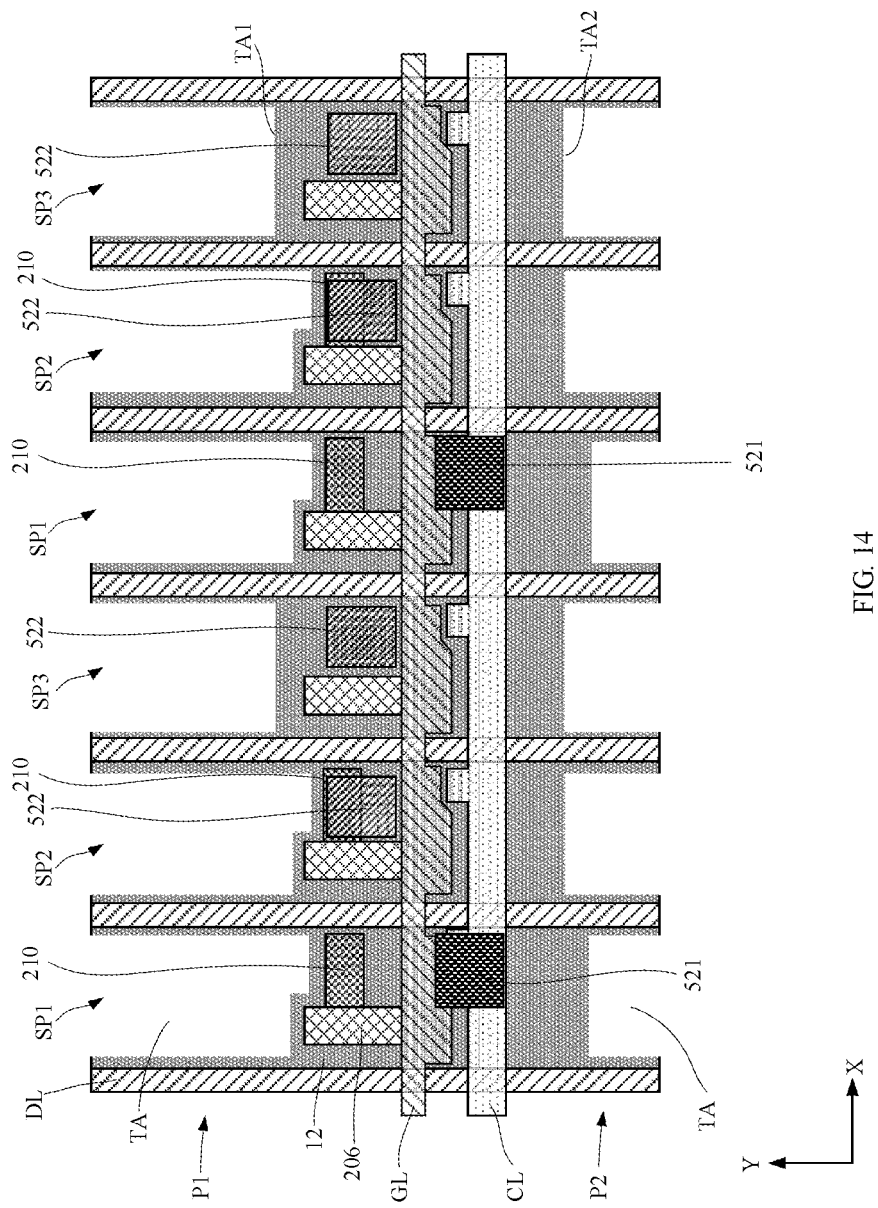
FIG. 14 is a partial enlarged view of a display panel according to other embodiments of the present disclosure.

FIG. 14 is a partial enlarged view of a display panel according to other embodiments of the present disclosure. With reference to FIG. 14, the plurality of sub spacers 52 may include first sub spacers 521 and second sub spacers 522.

The orthographic projection of the first sub spacer 521 on the second base substrate 20 may at least partially overlap the orthographic projection of the first boss 21 (a portion corresponding to the common electrode line CL) on the second base substrate 20, and the orthographic projection of the first sub spacer 521 on the second base substrate 20 may also at least partially overlap the orthographic projection of the second boss 22 (a portion corresponding to the gate line CL) on the second base substrate 20. For example, the first sub spacer 521 may be provided in the first sub-pixel SP1.

The second sub-pixel SP2 and the third sub-pixel SP3 may be respectively provided with the second sub spacer 522. In the second sub-pixel SP2, the metal step portion 210 is also provided, that is, the third boss is provided. The orthographic projection of the second sub spacer 522 in the second sub-pixel SP2 on the second base substrate 20 may at least partially overlap the orthographic projection of the third boss on the second base substrate 20. In the third sub-pixel SP3, no metal step portion 210 is provided, that is, no third boss is provided. In this way, the orthographic projection of the second sub spacer 522 in the third sub-pixel SP3 on the second base substrate 20 and the orthographic projection of the third boss on the second base substrate 20 do not overlap.

In this way, by arranging the first sub spacer 521 and the second sub spacer 522 at "complementary" positions, it may be ensured that when the first substrate is displaced upwards, downwards, leftwards, or rightwards relative to the second substrate, some of the sub spacers may still be supported on the bosses, so that the reliability and uniformity of the cell gap of the liquid crystal cell may still be maintained, and other sub spacers may be prevented from scratching the alignment film.

Figure 15:
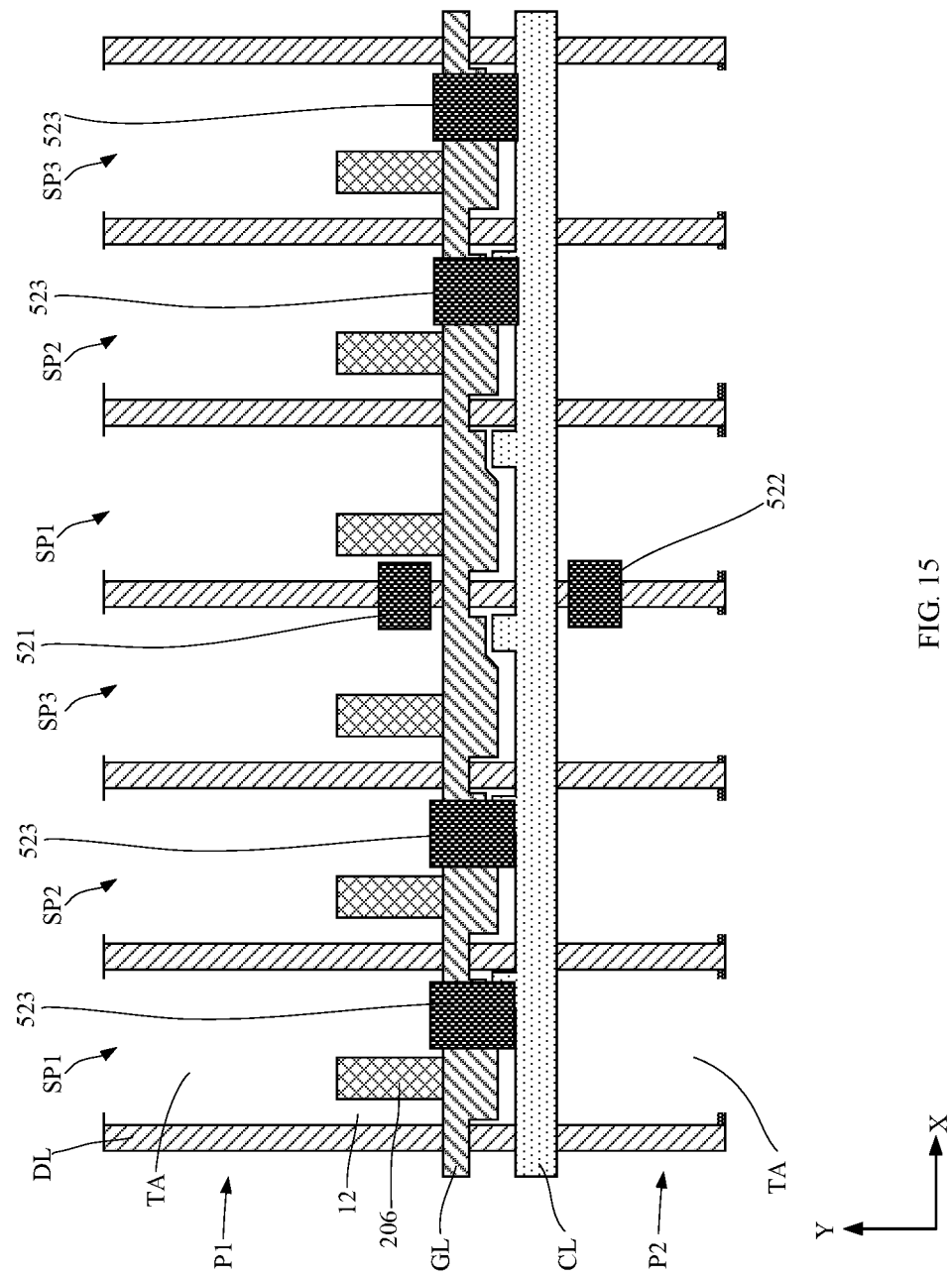
FIG. 15 is a partial enlarged view of a display panel according to other embodiments of the present disclosure.

FIG. 15 is a partial enlarged view of a display panel according to other embodiments of the present disclosure. With reference to FIG. 15, the plurality of sub spacers 52 may include first sub spacers 521, second sub spacers 522 and third sub spacers 523. The orthographic projection of each of the first sub spacer 521 and the second sub spacer 522 on the second base substrate 20 may at least partially overlap the orthographic projection of the data line DL on the second base substrate 20, and the first sub spacer 521 and the second sub spacer 522 may be provided on opposite sides of the gate line GL in the column direction Y. In this case, the data line DL may also be formed as a boss. The orthographic projection of the third sub spacer 523 on the second base substrate 20 may at least partially overlap with the orthographic projection of the second boss 22 on the second base substrate 20.

In this way, when the first substrate is displaced upwards and downwards relative to the second substrate, it may be ensured that the first sub spacers 521 and the second sub spacers 522 provided in the column direction Y may be supported on the bosses. When the substrate is displaced leftwards and rightwards relative to the second substrate, it may be ensured that the third spacer 523 may be supported on the bosses. Thus, when the displacement occurs, the reliability and uniformity of the cell gap of the liquid crystal cell may be maintained, and other sub spacers may be prevented from scratching the alignment film.

Figure 16:
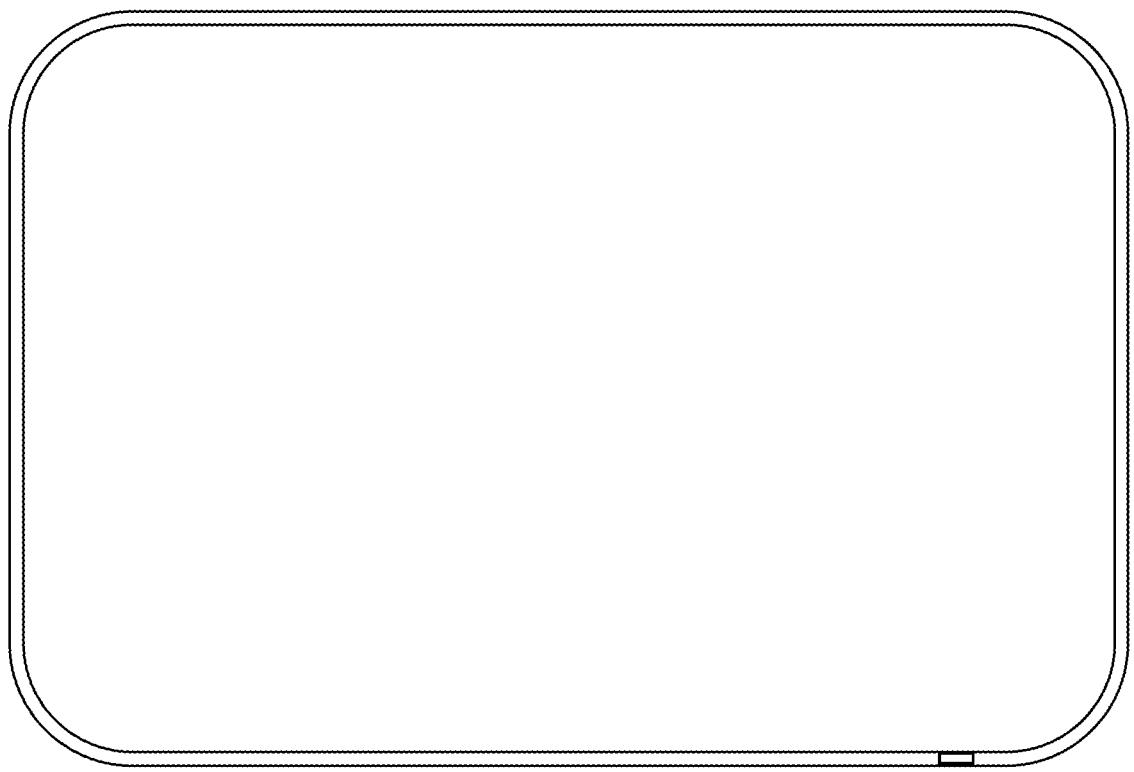
FIG. 16 is a schematic view of a display device according to some embodiments of the present disclosure.

At least one embodiment of the present disclosure also provides a display device 160. FIG. 16 is a schematic structural view of a display device according to embodiments of the present disclosure. As shown in FIG. 16, the display device includes the display panel provided according to any of the above embodiments. Therefore, the display device also has technical effects corresponding to the beneficial effects of the display panel included therein. For details, please refer to the above description.

For example, in some examples, the display device may be any product or component with a display function, such as a smart phone, a tablet computer, a television, a monitor, a notebook computer, a digital photo frame, a navigator, and the like.

Of course, the present disclosure may also have various other embodiments. While those skilled in the art may make various changes and modifications according to the embodiments of the present disclosure without departing from the spirit and essence of the present disclosure, these changes and modifications shall fall within the protection scope of the claims attached to the present disclosure.

What is claimed is:

1. A display panel, comprising:
a first substrate, the first substrate comprising:
  a first base substrate; and
  a plurality of spacers on the first base substrate, the plurality of spacers comprising a first sub spacer and a second sub spacer; and
a second substrate opposite to the first substrate, the second substrate comprising:
  a second base substrate;
  a gate line and a data line on the second base substrate, wherein the gate line extends in a row direction, and the data line extends in a column direction;
  a plurality of sub-pixels on the second base substrate, wherein the plurality of sub-pixels are arranged in an array in both the row direction and the column direction, and each of the plurality of sub-pixels comprises a light-transmitting area;
  a first boss on the second base substrate, the first boss extending in the row direction; and
  a second boss on the second base substrate,
wherein the second substrate comprises a first row of pixels and a second row of pixels adjacent to the first row of pixels in the column direction, and each of the first row of pixels and the second row of pixels comprises a plurality of sub-pixels sequentially arranged in the row direction;
the first boss and the gate line are arranged at an interval in the column direction, and the first boss is located between the gate line and light-transmitting areas of the plurality of sub-pixels in the second row of pixels;
an orthographic projection of the second boss on the second base substrate and an orthographic projection of the gate line on the second base substrate overlap;
an orthographic projection of the first sub spacer on the second base substrate and an orthographic projection of the first boss on the second base substrate at least partially overlap; and
an orthographic projection of the second sub spacer on the second base substrate is located between the gate line and light-transmitting areas of the plurality of sub-pixels in the first row of pixels.

2. The display panel according to claim 1, wherein the orthographic projection of the first sub spacer on the second base substrate and the orthographic projection of the second sub spacer on the second base substrate are respectively located on opposite sides of the gate line in the column direction.

3. The display panel according to claim 1, wherein the second substrate further comprises a third boss, the third boss is located on a side of the second boss away from the first boss in the column direction, and an orthographic projection of the third boss on the second base substrate and the orthographic projection of the first sub spacer on the second base substrate are arranged in the column direction.

4. The display panel according to claim 3, wherein the second substrate further comprises an alignment film on the second base substrate, a vertical distance between the second base substrate and a top surface of each of the first boss, the second boss, and the third boss away from the second base substrate is greater than a vertical distance between the second base substrate and a top surface of a portion of the alignment film in the light-transmitting area away from the second base substrate.

5. The display panel according to claim 4, wherein vertical distances between the second base substrate and top surfaces of the first boss, the second boss, and the third boss away from the second base substrate are equal to one another.

6. The display panel according to claim 3, wherein the orthographic projection of the second sub spacer on the second base substrate and the orthographic projection of the third boss on the second base substrate do not overlap.

7. The display panel according to claim 3, wherein the orthographic projection of the first sub spacer on the second base substrate and the orthographic projection of the third boss on the second base substrate are separated by a first predetermined distance in the column direction, the orthographic projection of the second sub spacer on the second base substrate and the orthographic projection of the first boss on the second base substrate are separated by a second predetermined distance in the column direction, and the first predetermined distance is equal to the second predetermined distance.

8. The display panel according to claim 3, wherein the second substrate further comprises a metal step portion, and the metal step portion and the gate line are located in the same layer; and
the orthographic projection of the third boss on the second base substrate and an orthographic projection of the metal step portion on the second base substrate overlap.

9. The display panel according to claim 8, wherein the second substrate further comprises:
a first electrode layer on the second base substrate;
a gate insulating layer on the first electrode layer;
a source and drain layer on the gate insulating layer, the source and drain layer comprising at least the data line and a drain electrode;
a passivation layer on the source and drain layer; and
a second electrode layer on the passivation layer,
wherein the second electrode layer comprises at least a pixel electrode, and the pixel electrode is electrically connected to the first electrode layer through via holes formed in the gate insulating layer and the passivation layer, and
the orthographic projection of the metal step portion on the second base substrate partially overlaps an orthographic projection of the first electrode layer on the second base substrate, and the metal step portion covers and contacts a side of the first electrode layer; and/or, the orthographic projection of the third boss on the second base substrate and an orthographic projection of the drain electrode on the second base substrate partially overlap.

10. The display panel according to claim 3, wherein each of the first row of pixels and the second row of pixels comprises a first sub-pixel, a second sub-pixel, and a third sub-pixel sequentially arranged in the row direction;
the orthographic projection of the first sub spacer on the second base substrate is located in the first sub-pixel in the second row of pixels; and
the orthographic projection of the second sub spacer on the second base substrate is located in the second sub-pixel and the third sub-pixel in the first row of pixels; and/or,
the orthographic projection of the first sub spacer on the second base substrate further partially overlaps the orthographic projection of the gate line on the second base substrate; and/or,
the orthographic projection of the second sub spacer in the second sub-pixel on the second base substrate and the orthographic projection of the third boss on the second base substrate partially overlap; and/or,
the orthographic projection of the second sub spacer in the third sub-pixel on the second base substrate and the orthographic projection of the third boss on the second base substrate do not overlap.

11. The display panel according to claim 1, wherein the plurality of spacers further comprises a third sub spacer and a fourth sub spacer;
a part of an orthographic projection of the third sub spacer on the second base substrate falls within the orthographic projection of the gate line on the second base substrate, and the other part of the orthographic projection of the third sub spacer on the second base substrate is located on a side of the gate line away from the first boss in the column direction; and a part of an orthographic projection of the fourth sub spacer on the second base substrate falls within an orthographic projection of the gate line on the second base substrate, and the other part of the orthographic projection of the fourth sub spacer on the second base substrate is located on a side of the gate line close to the first boss in the column direction.

12. The display panel according to claim 11, wherein the first sub spacer, the second sub spacer, the third sub spacer, and the fourth sub spacer are respectively provided in different sub-pixels.

13. The display panel according to claim 12, wherein each of the first row of pixels and the second row of pixels comprises first sub-pixels, second sub-pixels, and third sub-pixels sequentially arranged in the row direction;
the orthographic projection of the first sub spacer on the second base substrate is located in the first sub-pixel in the second row of pixels and
the orthographic projection of the second sub spacer on the second base substrate is located in the third sub-pixel in the first row of pixels; and/or, the orthographic projection of the third sub spacer on the second base substrate is located in the second sub-pixel in the first row of pixels and the orthographic projection of the fourth sub spacer on the second base substrate is located in the second sub-pixel in the second row of pixels.

14. The display panel according to claim 11, wherein the other part of the orthographic projection of the third sub spacer on the second base substrate and the orthographic projection of the third boss on the second base substrate do not overlap; or
the other part of the orthographic projection of the third sub spacer on the second base substrate and the orthographic projection of the third boss on the second base substrate partially overlap; and/or,
the other part of the orthographic projection of the fourth sub spacer on the second base substrate and the orthographic projection of the first boss on the second base substrate do not overlap; or the other part of the orthographic projection of the fourth sub spacer on the second base substrate and the orthographic projection of the first boss on the second base substrate partially overlap.

15. The display panel according to claim 11, wherein the plurality of spacers further comprises a main spacer, and a height of the main spacer is greater than a height of each of the first sub spacer, the second sub spacer, the third sub spacer, and the fourth sub spacer; and
an orthographic projection of the main spacer on the second base substrate and the orthographic projection of the gate line on the second base substrate at least partially overlap.

16. The display panel according to claim 1, wherein the orthographic projection of each of the first sub spacer and the second sub spacer on the second base substrate do not overlap the orthographic projection of the gate line on the second base substrate.

17. The display panel according to claim 1, wherein the second substrate further comprises a common electrode line extending in the row direction, and the orthographic projection of the first boss on the second base substrate and an orthographic projection of the common electrode line on the second base substrate overlap.

18. The display panel according to claim 1, wherein the first substrate further comprises a black matrix on the first base substrate, and orthographic projections of the plurality of spacers on the second base substrate all fall within an orthographic projection of the black matrix on the second base substrate; and a shortest distance between an edge of the orthographic projection of the first sub spacer on the second base substrate and an edge of the orthographic projection of the black matrix on the second base substrate is less than or equal to 5 microns; and/or, a shortest distance between an edge of the orthographic projection of the second sub spacer on the second base substrate and an edge of the orthographic projection of the black matrix on the second base substrate is less than or equal to 5 microns.

19. A display device comprising the display panel according to claim 1.

20. A display panel, comprising:
- a first substrate, the first substrate comprising:
  - a first base substrate; and
  - a plurality of spacers on the first base substrate, the plurality of spacers comprising a first sub spacer, a second sub spacer and a third sub spacer; and
- a second substrate opposite to the first substrate, the second substrate comprising:
  - a second base substrate;
  - a gate line and a data line on the second base substrate, wherein the gate line extends in a row direction, and the data line extends in a column direction;
  - a plurality of sub-pixels on the second base substrate, wherein the plurality of sub-pixels are arranged in an array in both the row direction and the column direction;
  - a first boss on the second base substrate, the first boss extending in the column direction; and
  - a second boss on the second base substrate, the second boss extending in the row direction, wherein an orthographic projection of the first boss on the second base substrate and an orthographic projection of the data line on the second base substrate overlap, and an orthographic projection of the second boss on the second base substrate and an orthographic projection of the gate line on the second base substrate overlap;

an orthographic projection of each of the first sub spacer and the second sub spacer on the second base substrate and the orthographic projection of the first boss on the second base substrate at least partially overlap; and an orthographic projection of the third sub spacer on the second base substrate and the orthographic projection of the second boss on the second base substrate at least partially overlap.

* * * * *